US012794645B2

(12) United States Patent
Khoshnevisan et al.

(10) Patent No.: US 12,794,645 B2
(45) Date of Patent: Nov. 10, 2026

(54) NACK-ONLY FEEDBACK FOR COMMON CODEWORD IN RATE SPLITTING

(71) Applicant: QUALCOMM Incorporated, San Diego, CA (US)

(72) Inventors: Mostafa Khoshnevisan, San Diego, CA (US); Xiaoxia Zhang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 646 days.

(21) Appl. No.: 18/074,277

(22) Filed: Dec. 2, 2022

(65) Prior Publication Data

US 2024/0187194 A1 Jun. 6, 2024

(51) Int. Cl.
*H04W 72/04* (2023.01)
*H04L 1/1607* (2023.01)
*H04L 5/00* (2006.01)

(52) U.S. Cl.
CPC .......... *H04L 5/0055* (2013.01); *H04L 1/1607* (2013.01)

(58) Field of Classification Search
CPC ... H04L 5/0055; H04L 1/1607; H04L 1/1854; H04L 1/1864; H04L 1/1861
See application file for complete search history.

(56) References Cited

U.S. PATENT DOCUMENTS

2010/0199140 A1* 8/2010 Lee ....................... H04L 5/0007 714/E11.113
2011/0218000 A1* 9/2011 Noh .................... H04W 52/267 455/501
2012/0155337 A1* 6/2012 Park ...................... H04L 1/1692 370/280
2013/0195065 A1* 8/2013 Park ...................... H04L 1/1861 370/329
2013/0329678 A1* 12/2013 Pan ....................... H04L 1/1671 370/329
2014/0036856 A1* 2/2014 Park ...................... H04L 5/0053 370/329
2014/0146756 A1 5/2014 Sahin et al.
2022/0376817 A1* 11/2022 Razavi .................. H04L 1/1812
(Continued)

FOREIGN PATENT DOCUMENTS

WO WO-2023122097 A1 * 6/2023

OTHER PUBLICATIONS

Dizdar O., et al., "Rate-Splitting Multiple Access: A New Frontier for the PHY Layer of 6G", Nov. 2020, 8 Pages.
(Continued)

*Primary Examiner* — Mahbubul Bar Chowdhury
(74) *Attorney, Agent, or Firm* — Shumaker & Sieffert, P.A.

(57) ABSTRACT

Techniques related to rate splitting in wireless communication are disclosed. Some aspects of the disclosure relate to devices and methods for NACK-only feedback for a common codeword in a rate splitting scheme. A wireless user equipment (UE) receives a private codeword and a common codeword in a rate splitting scheme. The UE transmits first feedback including an acknowledgment or negative acknowledgment (ACK/NACK) indicating whether the private codeword is properly decoded. The UE further transmits second feedback including NACK-only feedback when the common codeword is not properly decoded. Other aspects, embodiments, and features are also claimed and described.

29 Claims, 18 Drawing Sheets

(56) References Cited

U.S. PATENT DOCUMENTS

| | | | | |
|---|---|---|---|---|
| 2022/0400475 | A1* | 12/2022 | Suh | H04W 72/23 |
| 2023/0044542 | A1* | 2/2023 | Yao | H04W 72/30 |
| 2023/0050170 | A1* | 2/2023 | Wang | H04L 1/1854 |
| 2023/0062724 | A1* | 3/2023 | Zhou | H04L 1/1864 |
| 2023/0071767 | A1* | 3/2023 | Zhou | H04L 1/1896 |
| 2023/0189298 | A1* | 6/2023 | Lee | H04W 72/30 |
| 2024/0155599 | A1* | 5/2024 | Matsumura | H04W 72/232 |
| 2024/0259144 | A1* | 8/2024 | Yao | H04W 72/21 |
| 2024/0305417 | A1* | 9/2024 | Huschke | H04L 1/1854 |
| 2025/0167926 | A1* | 5/2025 | Lei | H04L 1/1812 |

OTHER PUBLICATIONS

Joudeh H., et al., "Sum-Rate Maximization for Linearly Precoded Downlink Multiuser MISO Systems with Partial CSIT: A Rate-Splitting Approach", pp. 1-15, Nov. 2016.
Mao Y., et al., "Rate-Splitting Multiple Access for Downlink Communication Systems: Bridging, Generalizing and Outperforming SDMA and NOMA", EURASIP Journal on Wireless Communications and Networking, arxiv.org, Cornell University Library, 201 Olin library Cornell University Ithaca, NY 14853, Apr. 17, 2018, Oct. 30, 2017, XP081313481, pp. 1-54.
International Search Report and Written Opinion—PCT/US2023/078822—ISA/EPO—Feb. 20, 2024.

* cited by examiner

900

| Value of HARQ-ACK information bits | | | | PUCCH resource |
|---|---|---|---|---|
| {0} | {0,0} | {0,0,0} | {0,0,0,0} | 1st PUCCH resource from *resourceList* |
| | {1,0} | {1,0,0} | {1,0,0,0} | 2nd PUCCH resource from *resourceList* |
| | {0,1} | {0,1,0} | {0,1,0,0} | 3rd PUCCH resource from *resourceList* |
| | | {1,1,0} | {1,1,0,0} | 4th PUCCH resource from *resourceList* |
| | | {0,0,1} | {0,0,1,0} | 5th PUCCH resource from *resourceList* |
| | | {1,0,1} | {1,0,1,0} | 6th PUCCH resource from *resourceList* |
| | | {0,1,1} | {0,1,1,0} | 7th PUCCH resource from *resourceList* |
| | | | {1,1,1,0} | 8th PUCCH resource from *resourceList* |
| | | | {0,0,0,1} | 9th PUCCH resource from *resourceList* |
| | | | {1,0,0,1} | 10th PUCCH resource from *resourceList* |
| | | | {0,1,0,1} | 11th PUCCH resource from *resourceList* |
| | | | {1,1,0,1} | 12th PUCCH resource from *resourceList* |
| | | | {0,0,1,1} | 13th PUCCH resource from *resourceList* |
| | | | {1,0,1,1} | 14th PUCCH resource from *resourceList* |
| | | | {0,1,1,1} | 15th PUCCH resource from *resourceList* |

FIG. 9

NACK-ONLY FEEDBACK FOR COMMON CODEWORD IN RATE SPLITTING

TECHNICAL FIELD

The technology discussed below relates generally to wireless communication systems, and more particularly, to rate splitting multiple access. Certain aspects may relate to techniques for enabling and providing communication devices configured to use rate splitting multiple access techniques.

INTRODUCTION

Rate splitting, sometimes referred to as rate splitting multiple access (RSMA), is a framework for wireless communication with advanced interference management. NACK-only feedback is a hybrid automatic repeat request (HARQ) data integrity scheme where a receiving device transmits a negative acknowledgment (NACK) when the receiving device fails to properly receive and decode a message.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. While some examples may be discussed as including certain aspects or features, all discussed examples may include any of the discussed features. And unless expressly described, no one aspect or feature is essential to achieve technical effects or solutions discussed herein.

In various aspects, the present disclosure relates to a rate splitting scheme, where rate splitting is used for advanced interference management in wireless communication. With rate splitting, a message is split or divided into a private part (private codeword) and a common part (common codeword). The common part is a combined message that includes a portion of each one of a set of one or more messages.

Because the common codeword is received by multiple devices, much like in a multicast-broadcast service (MBS) system, a rate splitting scheme can gain at least some of the advantages of an MBS system by employing NACK-only feedback for the common codeword. For example, by using NACK-only feedback for the common codeword in a rate splitting scheme, signaling overhead can be reduced, and power savings at the mobile device may be achieved.

In some aspects, the present disclosure provides a user equipment (UE) configured for wireless communication. The UE includes a memory for storing instructions and a processor coupled to the memory and configured to execute the instructions to cause the user equipment to: receive a private codeword and a first common codeword in a rate splitting scheme, wherein the private codeword comprises a first message for the user equipment and the first common codeword comprises a combination of one or more messages including a second message for the user equipment; to transmit a first feedback comprising an acknowledgment or negative-acknowledgment (ACK/NACK) indicating whether the private codeword is properly decoded; and to transmit a second feedback comprising a NACK-only feedback when the first common codeword is not properly decoded.

These and other aspects of the technology discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various devices, systems, and methods.

BRIEF DESCRIPTION OF THE DRAWINGS

FIG. 9 is a table illustrating the use of a list of PUCCH resources for NACK-only feedback according to some aspects of this disclosure.

DETAILED DESCRIPTION

In various aspects, the present disclosure provides for NACK-only feedback for the common codeword when using rate splitting for downlink MU-MIMO. As disclosed herein, a wireless communication network may gain at least some of the advantages of NACK-only feedback (e.g., reduced overhead and interference, UE power savings) in a rate splitting scheme by using NACK-only feedback for the common codeword when using rate splitting for downlink MU-MIMO. In this way, the interference cancellation features of a rate splitting scheme can be augmented with the advantages of NACK-only feedback.

In some examples, the common codeword may be separately scheduled from the private codeword (e.g., using separate downlink control information, DCI). In these examples, the slot offset for HARQ-ACK feedback can be separately scheduled. In other examples, a single DCI may be used for scheduling both the common codeword and the private codeword. Various aspects of this disclosure address scheduling HARQ-ACK feedback for a private codeword and a common codeword in a rate splitting scheme.

Figure 1:
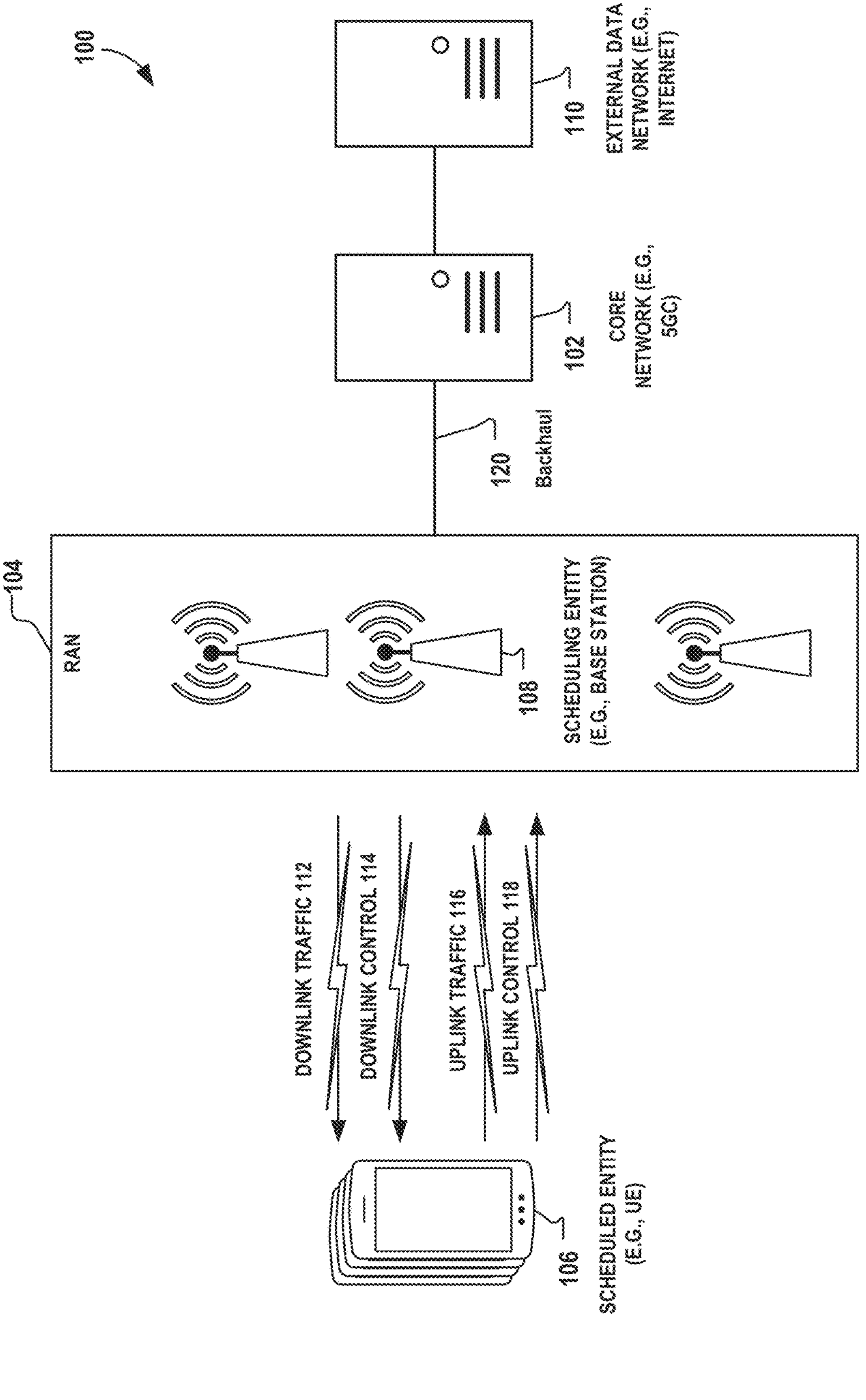
FIG. 1 is a schematic illustration of a wireless communication system according to some aspects of this disclosure.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an evolved Node B (eNB), a gNode B (gNB), a 5G NB, a transmit receive point (TRP), or some other suitable terminology.

The radio access network (RAN) 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; and agricultural equipment; etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data. A mobile apparatus may additionally include two or more disaggregated devices in communication with one another, including, for example, a wearable device, a haptic sensor, a limb movement sensor, an eye movement sensor, etc., paired with a smartphone. In various examples, such disaggregated devices may communicate directly with one another over any suitable communication channel or interface, or may indirectly communicate with one another over a network (e.g., a local area network or LAN).

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., network node 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a network node 108) allocates resources for communication among some or all devices and equipment within its service area or cell. Within the present disclosure, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by a scheduling entity 108.

Base stations are not the only entities that may function as scheduling entities. That is, in some examples, a UE or network node may function as a scheduling entity, scheduling resources for one or more scheduled entities (e.g., one or more UEs).

As illustrated in FIG. 1, a network node 108 may broadcast downlink traffic 112 to one or more UEs 106. Broadly, the network node 108 is a node or device responsible for scheduling traffic in a wireless communication network, including downlink traffic 112 and, in some examples, uplink traffic 116 from one or more UEs 106 to the network node 108. On the other hand, the UE 106 is a node or device that receives downlink control information 114, including but not limited to scheduling information (e.g., a grant), synchronization or timing information, or other control information from another entity in the wireless communication network such as the network node 108.

In general, network nodes 108 may include a backhaul interface for communication with a backhaul portion 120 of the wireless communication system. The backhaul 120 may provide a link between a network node 108 and the core network 102. Further, in some examples, a backhaul network may provide interconnection between the respective network nodes 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
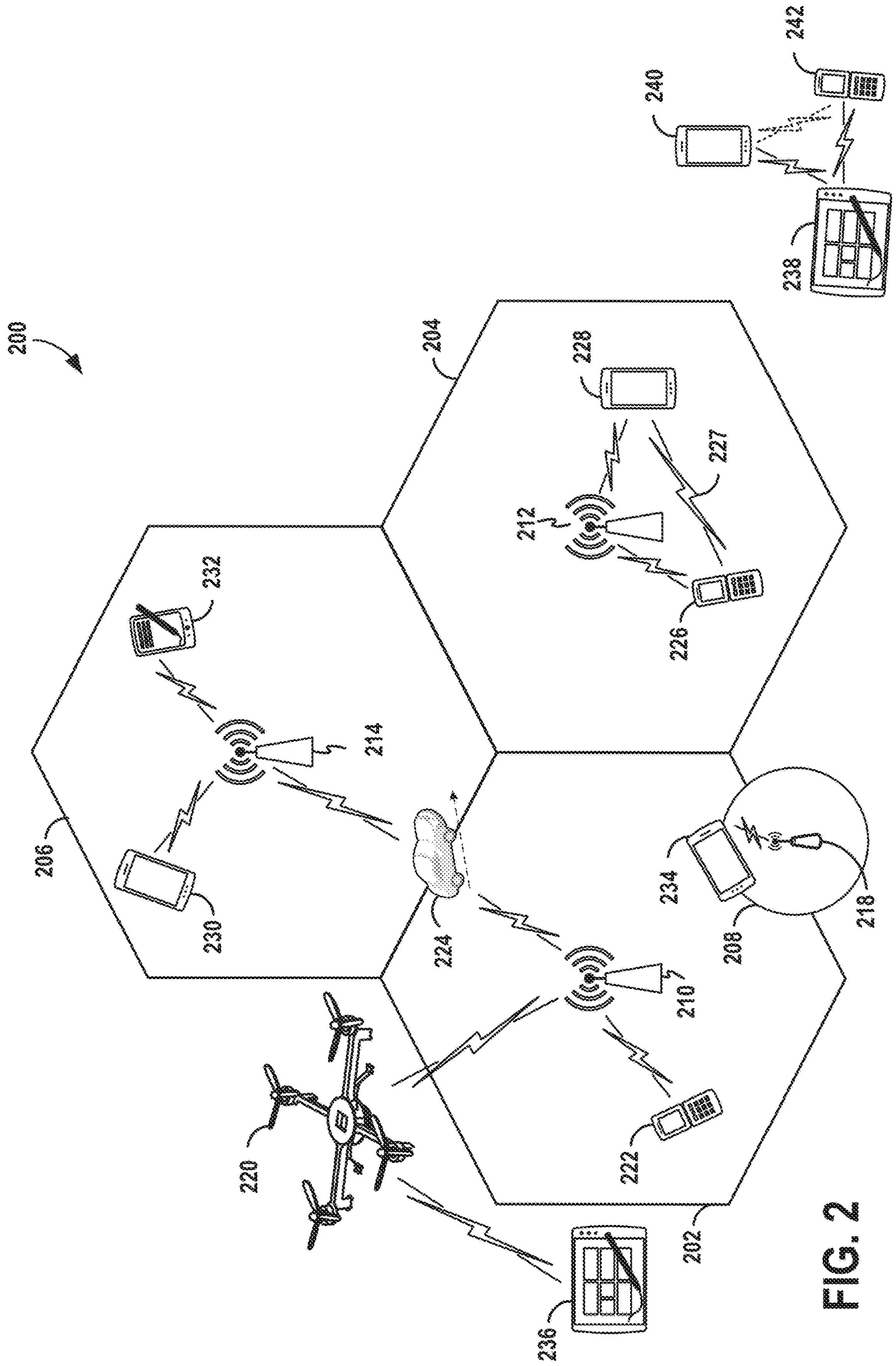
FIG. 2 is a conceptual illustration of an example of a radio access network according to some aspects of this disclosure.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point, base station, or network node. FIG. 2 illustrates macrocells 202, 204, and 206, and a small cell 208.

FIG. 2 shows two three network nodes 210, and 212, and 214 in cells 202, 204, and 206. In the illustrated example, the cells 202, 204, and 206 may be referred to as macrocells, as the network nodes 210, 212, and 214 support cells having a large size. Further, a network node 218 is shown in the small cell 208 (e.g., a microcell, picocell, femtocell, home base station, home Node B, home eNode B, etc.) which may overlap with one or more macrocells. In this example, the cell 208 may be referred to as a small cell, as the network node 218 supports a cell having a relatively small size. Cell sizing can be done according to system design as well as component constraints.

The RAN 200 may include any number of wireless network nodes and cells. Further, a RAN may include a relay node to extend the size or coverage area of a given cell. The network nodes 210, 212, 214, 218 provide wireless access points to a core network for any number of mobile apparatuses. In some examples, the network nodes 210, 212, 214, and/or 218 may be the same as the base station/scheduling entity 108 described above and illustrated in FIG. 1.

FIG. 2 further includes a quadcopter or drone 220, which may be configured to function as a network node. That is, in some examples, a cell may not necessarily be stationary, and the geographic area of the cell may move according to the location of a mobile network node such as the quadcopter 220.

Within the RAN 200, each network node 210, 212, 214, 218, and 220 may be configured to provide an access point to a core network 102 (see FIG. 1) for all the UEs in the respective cells. For example, UEs 222 and 224 may be in communication with network node 210; UEs 226 and 228 may be in communication with network node 212; UEs 230 and 232 may be in communication with network node 214; UE 234 may be in communication with network node 218; and UE 236 may be in communication with mobile network node 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with network node 210.

In a further aspect of the RAN 200, sidelink signals may be used between UEs without necessarily relying on scheduling or control information from a network node (e.g., a scheduling entity). For example, two or more UEs (e.g., UEs 226 and 228) may communicate with each other using peer to peer (P2P) or sidelink signals 227 without relaying that communication through a network node. In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, gNB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU. DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
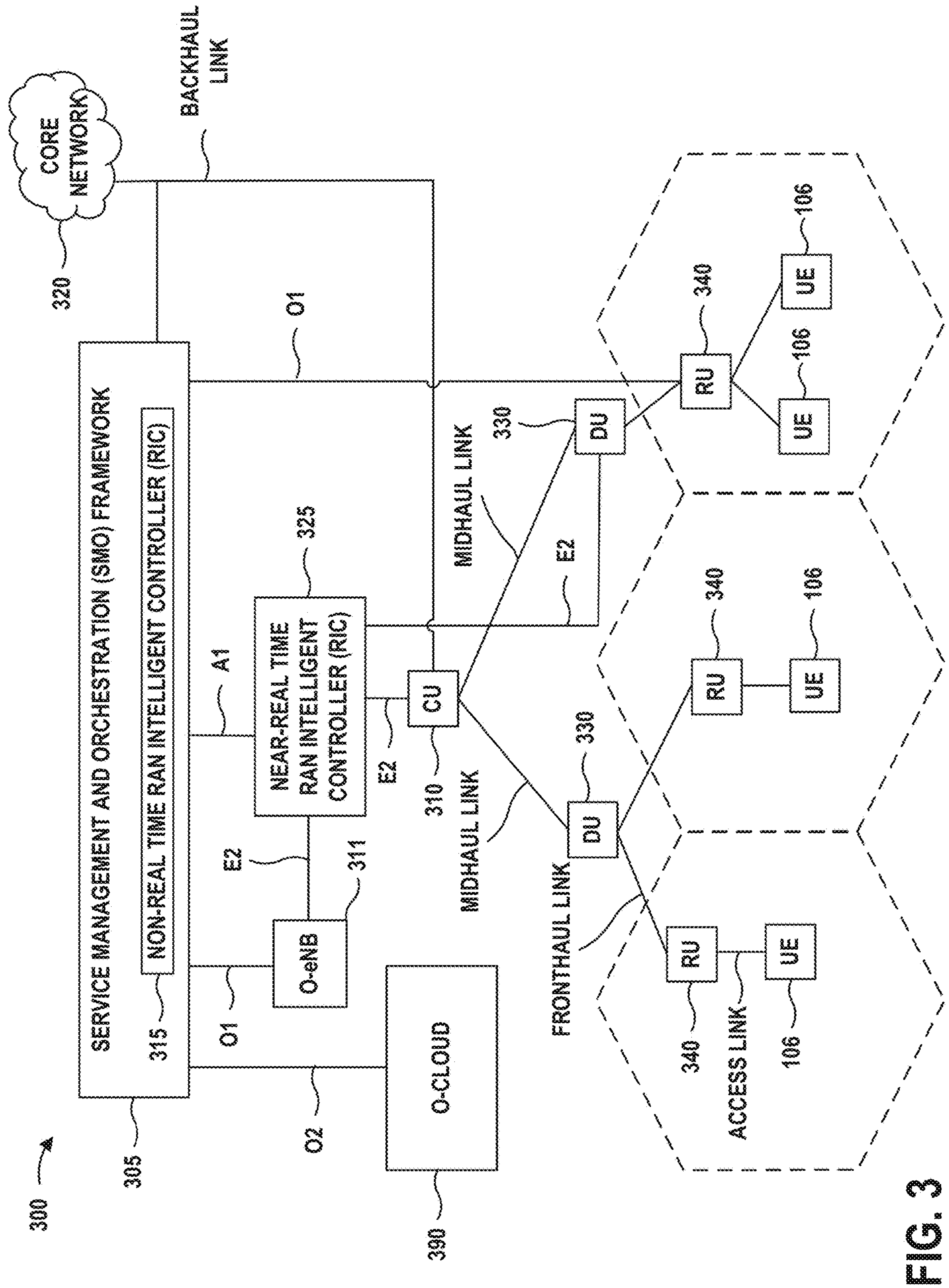
FIG. 3 is a schematic illustration of an open radio access network (ORAN) as it may be implemented according to some aspects of this disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 106 via one or more radio frequency (RF) access links. In some implementations, the UE 106 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 106. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an 01 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310. DUs 330, RUs 340 and Near-RT RICs 325. In some implementations, the SMO Framework 305 can communicate with a hardware aspect of a 4G RAN, such as an open eNB (O-eNB) 311, via an 01 interface. Additionally, in some implementations, the SMO Framework 305 can communicate directly with one or more RUs 340 via an 01 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as AI policies).

Figure 4:
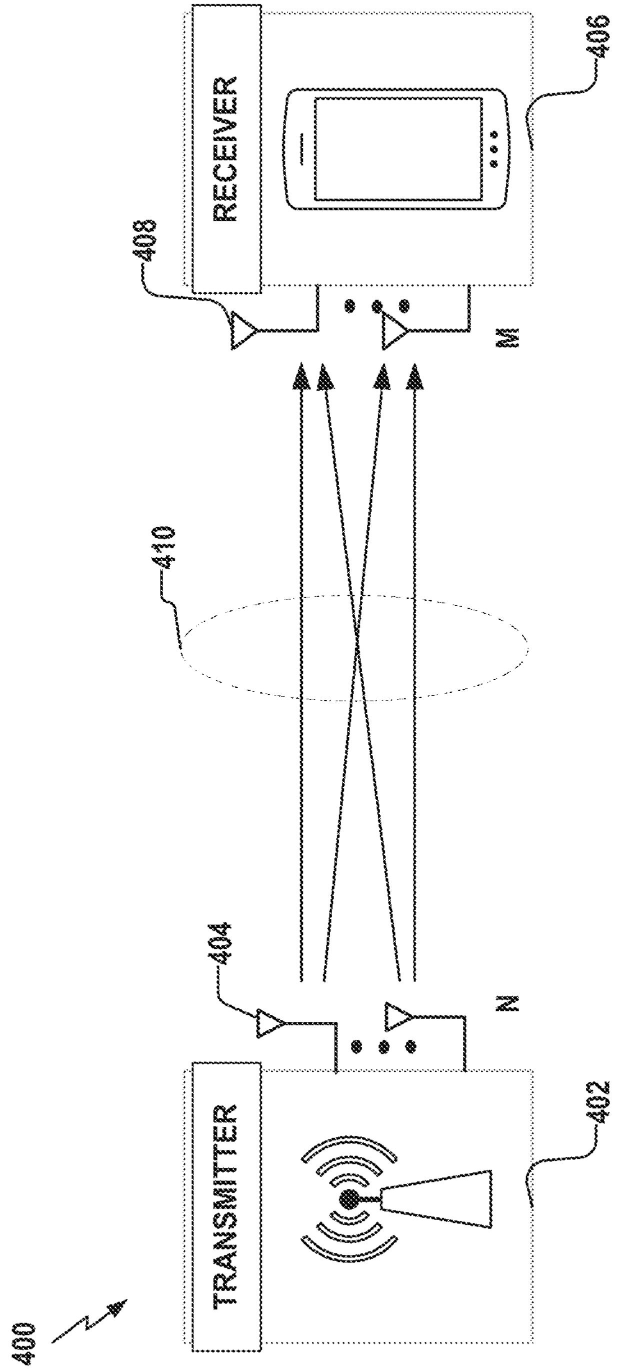
FIG. 4 is a block diagram illustrating a wireless communication system supporting multiple-input multiple-output (MIMO) communication according to some aspects of this disclosure.

In some aspects of the disclosure, a network node and/or UE may be configured with multiple antennas for beamforming and/or multiple-input multiple-output (MIMO) technology. FIG. 4 illustrates an example of a wireless communication system 400 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitter 402 may send multiple data streams to a single receiver. In this way, a MIMO system takes advantage of capacity gains and/or increased data rates associated with using multiple antennas in rich scattering environments where channel variations can be tracked. Here, the receiver 406 may track these channel variations and provide corresponding feedback to the transmitter 402. In one example case, as shown in FIG. 4, a rank-2 (i.e., including 2 data streams) spatial multiplexing transmission on a 2×2 MIMO antenna configuration will transmit two data streams via two transmit antennas 404. The signal from each transmit antenna 404 reaches each receive antenna 408 along a different signal path 410. The receiver 406 may then reconstruct the data streams using the received signals from each receive antenna 408.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency and reducing the required transmission energy. This is achieved by a transmitter 402 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiver 406) may transmit feedback including a quantized version of the channel so that the transmitter 402 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 404 or 408, whichever is lower. In addition, the channel conditions at the receiver 406, as well as other considerations, such as the available resources at the transmitter 402, may also affect the transmission rank. For example, a network node in a RAN (e.g., transmitter 402) may assign a rank (and therefore, a number of data streams) for a DL transmission to a particular UE (e.g., receiver 406) based on a rank indicator (RI) the UE transmits to the network node. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The network node may use the RI along with resource information (e.g., the available resources and amount of data to be scheduled for the UE) to assign a DL transmission rank to the UE.

The transmitter 402 determines the precoding of the transmitted data stream or streams based, e.g., on known channel state information of the channel on which the transmitter 402 transmits the data stream(s). For example, the transmitter 402 may transmit one or more suitable reference signals (e.g., a channel state information reference signal, or CSI-RS) that the receiver 406 may measure. The receiver 406 may then report measured channel quality information (CQI) back to the transmitter 402. This CQI generally reports the current communication channel quality, and in some examples, a requested transport block size (TBS) for future transmissions to the receiver. In some examples, the receiver 406 may further report a precoding matrix indicator (PMI) to the transmitter 402. This PMI generally reports the receiver's 406 preferred precoding matrix for the transmitter 402 to use, and may be indexed to a predefined codebook. The transmitter 402 may then utilize this CQI/PMI to determine a suitable precoding matrix for transmissions to the receiver 406.

In Time Division Duplex (TDD) systems, the UL and DL may be reciprocal, in that each uses different time slots of the same frequency bandwidth. Therefore, in TDD systems, a transmitter 402 may assign a rank for DL MIMO transmissions based on an UL SINR measurement (e.g., based on a sounding reference signal (SRS) or other pilot signal transmitted from the receiver 406). Based on the assigned rank, the transmitter 402 may then transmit a channel state information reference signal (CSI-RS) with separate sequences for each layer to provide for multi-layer channel estimation. From the CSI-RS, the receiver 406 may measure the channel quality across layers and resource blocks. The receiver 406 may then transmit a CSI report (including, e.g., CQI, RI, and PMI) to the transmitter 402 for use in updating the rank and assigning resources for future DL transmissions.

Figure 5:
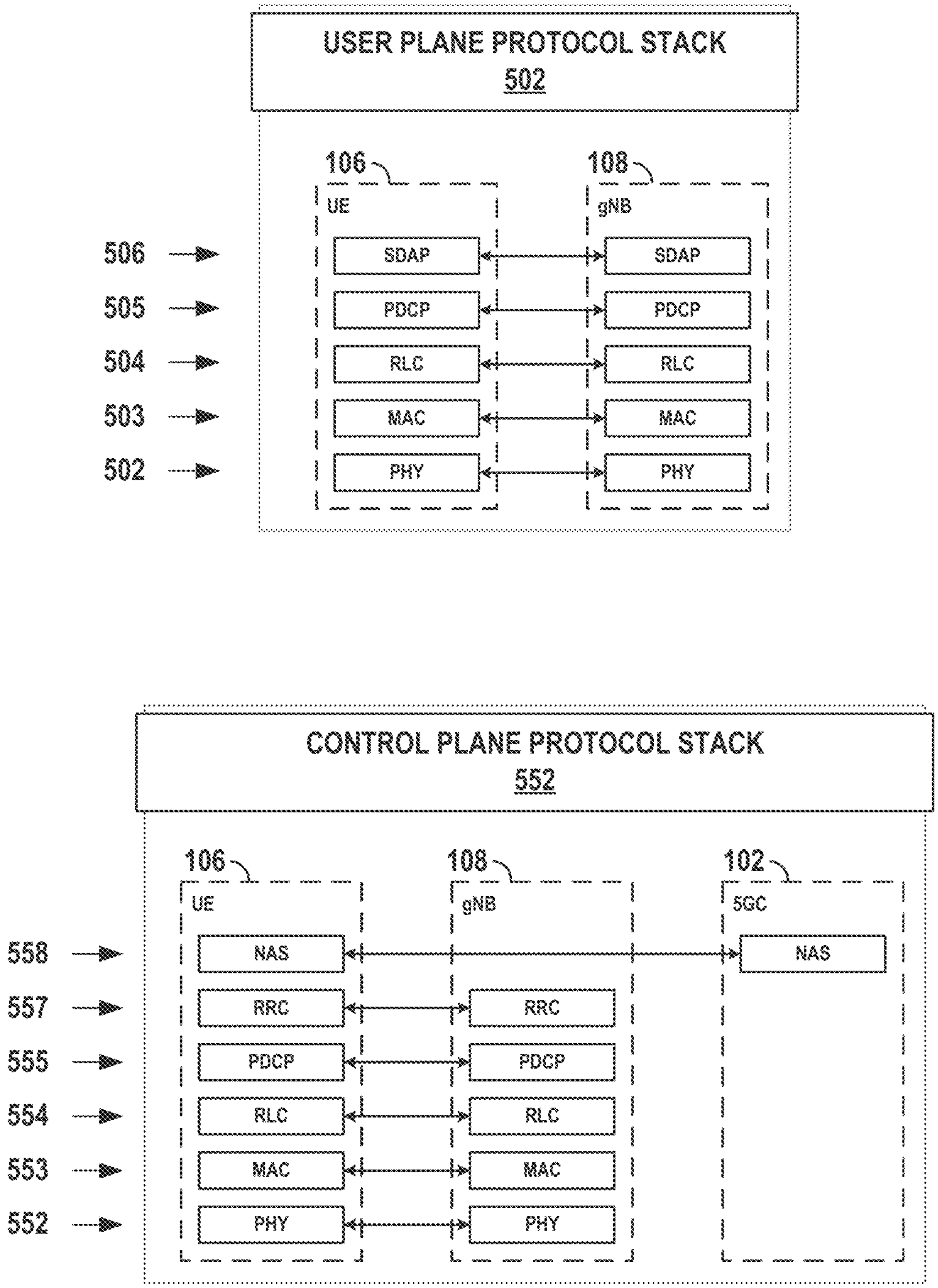
FIG. 5 is a schematic illustration of the radio protocol architecture in an example of a radio access network according to some aspects of this disclosure.

FIG. 5 is a schematic illustration of a user plane protocol stack 502 and a control plane protocol stack 552 in accordance with some aspects of this disclosure. In a wireless telecommunication system, the communication protocol architecture may take on various forms depending on the application. For example, in a 3GPP NR system, the signaling protocol stack is divided into Non-Access Stratum (NAS, 558) and Access Stratum (AS, 502-506 and 552-557) layers and protocols. The NAS protocol 558 provides upper layers, for signaling between a UE 106 and a core network 102 (referring to FIG. 1). The AS protocol 502-506 and 552-557 provides lower layers, for signaling between the RAN 104 (e.g., a gNB or other network node 108) and the UE 106.

Turning to FIG. 5, a radio protocol architecture is illustrated with a user plane protocol stack 502 and a control plane protocol stack 552, showing their respective layers or sublayers. Radio bearers between a network node 108 and a UE 106 may be categorized as data radio bearers (DRB) for carrying user plane data, corresponding to the user plane protocol 502; and signaling radio bearers (SRB) for carrying control plane data, corresponding to the control plane protocol 552.

In the AS, both the user plane 502 and control plane 552 protocols include a physical layer (PHY) 502/552, a medium access control layer (MAC) 503/553, a radio link control layer (RLC) 504/554, and a packet data convergence protocol layer (PDCP) 505/555. PHY 502/552 is the lowest layer and implements various physical layer signal processing functions. The MAC layer 503/553 provides multiplexing between logical and transport channels and is responsible for various functions. For example, the MAC layer 503/553 is responsible for reporting scheduling information, priority handling and prioritization, and error correction through hybrid automatic repeat request (HARQ) operations. The RLC layer 504/554 provides functions such as sequence numbering, segmentation and reassembly of upper layer data packets, and duplicate packet detection. The PDCP layer 505/555 provides functions including header compression for upper layer data packets to reduce radio transmission overhead, security by ciphering the data packets, and integrity protection and verification.

In the user plane protocol stack 502, a service data adaptation protocol (SDAP) layer 506 provides services and functions for maintaining a desired quality of service (QoS). And in the control plane protocol stack 552, a radio resource control (RRC) layer 557 includes a number of functional entities for routing higher layer messages, handling broadcasting and paging functions, establishing and configuring radio bearers, NAS message transfer between NAS and UE, etc.

A NAS protocol layer 558 provides for a wide variety of control functions between the UE 106 and core network 102. These functions include, for example, registration management functionality, connection management functionality, and user plane connection activation and deactivation.

Figure 6:
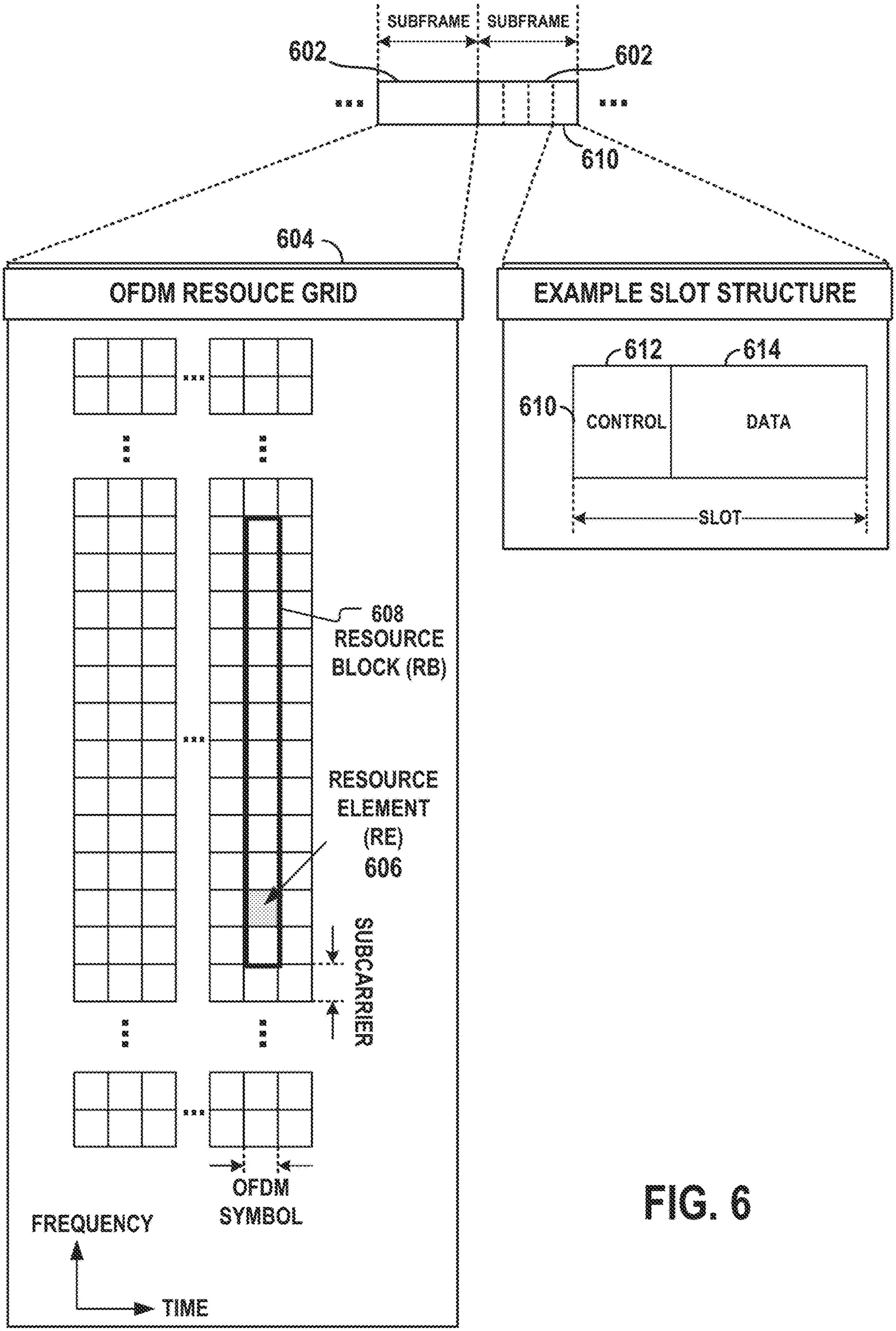
FIG. 6 is a schematic illustration of an organization of wireless resources in an air interface utilizing orthogonal frequency divisional multiplexing (OFDM) according to some aspects of this disclosure.

FIG. 6 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may include a set of subframes (e.g., 10 subframes of 1 ms each). A given carrier may include one set of frames in the UL, and another set of frames in the DL. FIG. 6 illustrates an expanded view of an exemplary DL subframe 602, showing an OFDM resource grid 604. However, as those skilled in the art will readily appreciate, the PHY transmission structure for any application may vary from the example described here, depending on any number of factors. Here, time is in the horizontal direction with units of OFDM symbols; and frequency is in the vertical direction with units of subcarriers or tones.

The resource grid 604 may schematically represent time-frequency resources for a given antenna port. That is, in a MIMO implementation with multiple antenna ports available, a corresponding multiple number of resource grids 604 may be available for communication. The resource grid 604 is divided into multiple resource elements (REs) 606. An RE, which is 1 subcarrier×1 symbol, is the smallest discrete part of the time-frequency grid and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 608, which contains any suitable number of consecutive subcarriers in the frequency domain. In one example, an RB may span 12 subcarriers, a number independent of the numerology used. In some examples, depending on the numerology, an RB may include any suitable number of consecutive OFDM symbols in the time domain.

A given UE generally utilizes only a subset of the resource grid 604. An RB may be the smallest unit of resources that a scheduler can allocate to a UE. Thus, the more RBs scheduled for a UE, and the higher the modulation scheme chosen for the air interface, the higher the data rate for the UE.

In this illustration, RB 608 occupies less than the entire bandwidth of the subframe 602, with some subcarriers illustrated above and below the RB 608. In a given implementation, subframe 602 may have a bandwidth corresponding to any number of one or more RBs 608. Further, the RB 608 is shown occupying less than the entire duration of the subframe 602, although this is merely one possible example.

Each 1 ms subframe 602 may include one or multiple adjacent slots. In FIG. 6, one subframe 602 includes four slots 610, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A network node may in some cases transmit these mini-slots occupying resources scheduled for ongoing slot transmissions for the same or for different UEs.

An expanded view of one of the slots 610 illustrates the slot 610 including a control region 612 and a data region 614. In general, the control region 612 may carry control channels (e.g., PDCCH), and the data region 614 may carry data channels (e.g., PDSCH or PUSCH). Of course, a slot may contain all DL, all UL, or at least one DL portion and at least one UL portion. The structure illustrated in FIG. 6 is merely exemplary in nature, and different slot structures may be utilized, and may include one or more of each of the control region(s) and data region(s).

Although not illustrated in FIG. 6, the various REs 606 within an RB 608 may carry one or more physical channels, including control channels, shared channels, data channels, etc. Other REs 606 within the RB 608 may also carry pilots or reference signals. These pilots or reference signals may provide for a receiving device to perform channel estimation of the corresponding channel, which may enable coherent demodulation/detection of the control and/or data channels within the RB 608.

In a DL transmission, the transmitting device (e.g., a network node 108) may allocate one or more REs 606 (e.g., within a control region 612) to carry one or more DL control channels. These DL control channels include DL control information 114 (DCI) that generally carries information originating from higher layers, such as a physical broadcast channel (PBCH), a physical downlink control channel (PDCCH), etc., to one or more UEs 106. In addition, the network node may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A network node may transmit the synchronization signals PSS and SSS (collectively referred to as SS), and in some examples, the PBCH, in an SS block that includes 4 consecutive OFDM symbols. In the frequency domain, the SS block may extend over 240 contiguous subcarriers. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a UE 106) may utilize one or more REs 606 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the network node 108 to schedule uplink transmissions. Here, in response to the SR transmitted on the UL control channel 118 (e.g., a PUCCH), the network node 108 may transmit downlink control information (DCI) 14 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc. In another example, as described further below, rather than a HARQ ACK/NACK, a receiving device may be configured for NACK-only feedback, wherein a NACK feedback is only transmitted in the case the integrity check fails. Typically, in these examples, no ACK is transmitted in the case the integrity check succeeds. In other words, a UE may forgo to transmit acknowledgment information such as HARQ-ACK feedback. Here, by forgoing to transmit the HARQ-ACK feedback, the UE may forgo to make an UL transmission using a resource designated for HARQ-ACK feedback.

In addition to control information, one or more REs 606 (e.g., within the data region 614) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIGS. 1 and 6 are not necessarily all the channels or carriers that may be utilized between a network node 108 and UE 106, and those of ordinary skill in the art will recognize that other channels or carriers may be utilized in addition to those illustrated, such as other traffic, control, and feedback channels.

Figure 7:
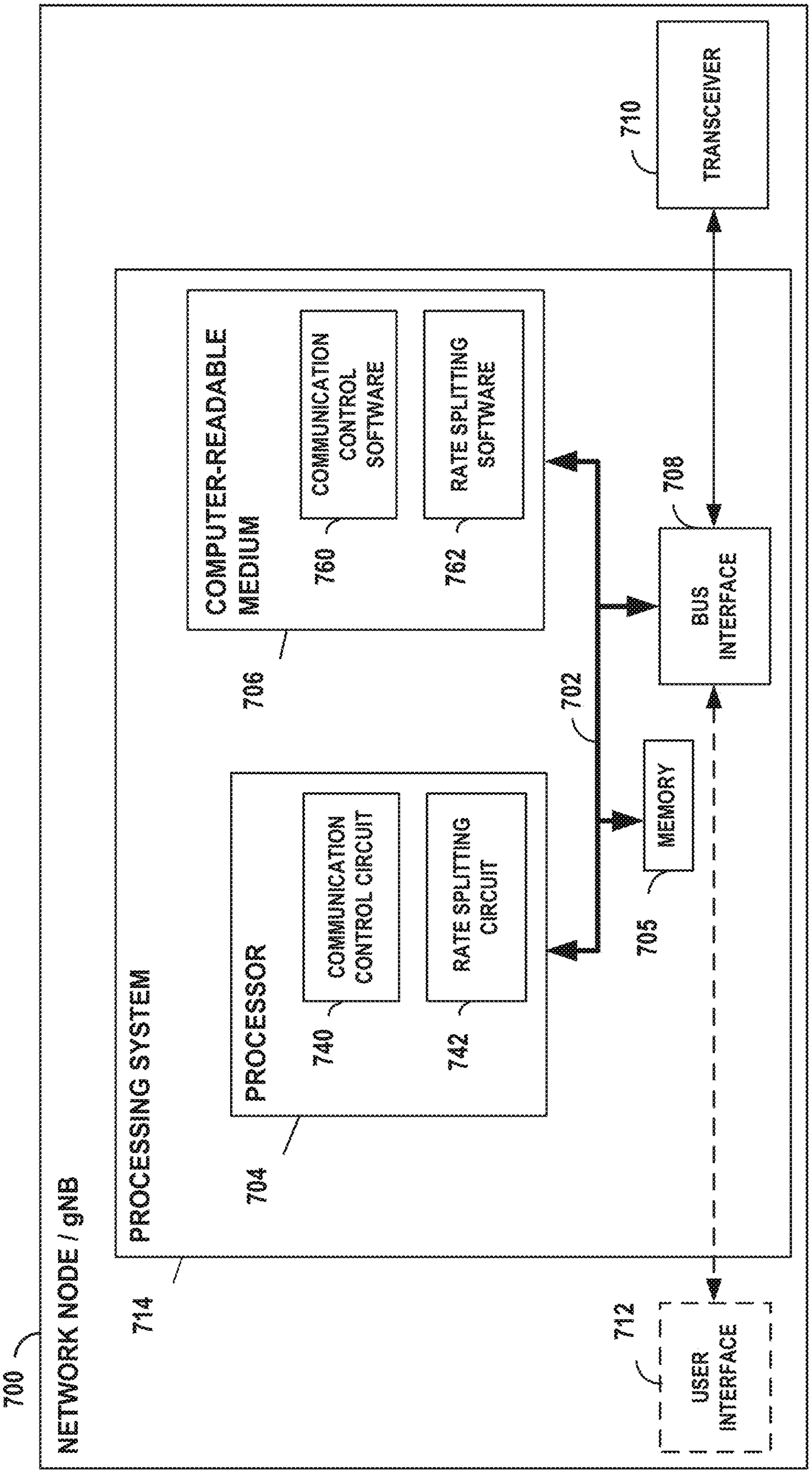
FIG. 7 is a block diagram conceptually illustrating an example of a hardware implementation for a network node according to some aspects of this disclosure.

FIG. 7 is a block diagram illustrating an example of a hardware implementation for a network node 700 employing a processing system 714. For example, the network node 700 may be a user equipment (UE) as illustrated in any one or more of FIGS. 1, 2, 3, and/or 4. In another example, the network node 700 may be a base station as illustrated in any one or more of FIGS. 1, 2, 3, and/or 4.

The network node 700 may include a processing system 714 having one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 700 may be configured to perform any one or more of the functions described herein.

The processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and some examples, such as a base station, may omit it.

In some aspects of the disclosure, the processor 704 may include communication control circuitry 740 configured (e.g., in coordination with the memory 705) for various functions, including, e.g., communicating user data and/or control signaling to/from one or more UEs. The processor 704 may further include rate splitting circuitry 742 configured (e.g., in coordination with the memory 705) for various functions, including, e.g., carrying out a rate splitting scheme as described below, e.g., in FIG. 10.

The processor 704 is responsible for managing the bus 702 and general processing, including the execution of software stored on the computer-readable medium 706. The software, when executed by the processor 704, causes the processing system 714 to perform the various functions described below for any particular apparatus. The processor 704 may also use the computer-readable medium 706 and the memory 705 for storing data that the processor 704 manipulates when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may store computer-executable code that includes communication control software 760 that configures a network node 700 for various functions, including, e.g., communicating user data and/or control signaling to/from one or more UEs. The computer-readable storage medium 706 may further store computer-executable code that includes rate splitting software 762 that configures a network node 700 for various functions, including, e.g., carrying out a rate splitting scheme as described, for example, below in FIG. 10.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 3, and/or 4.

Figure 8:
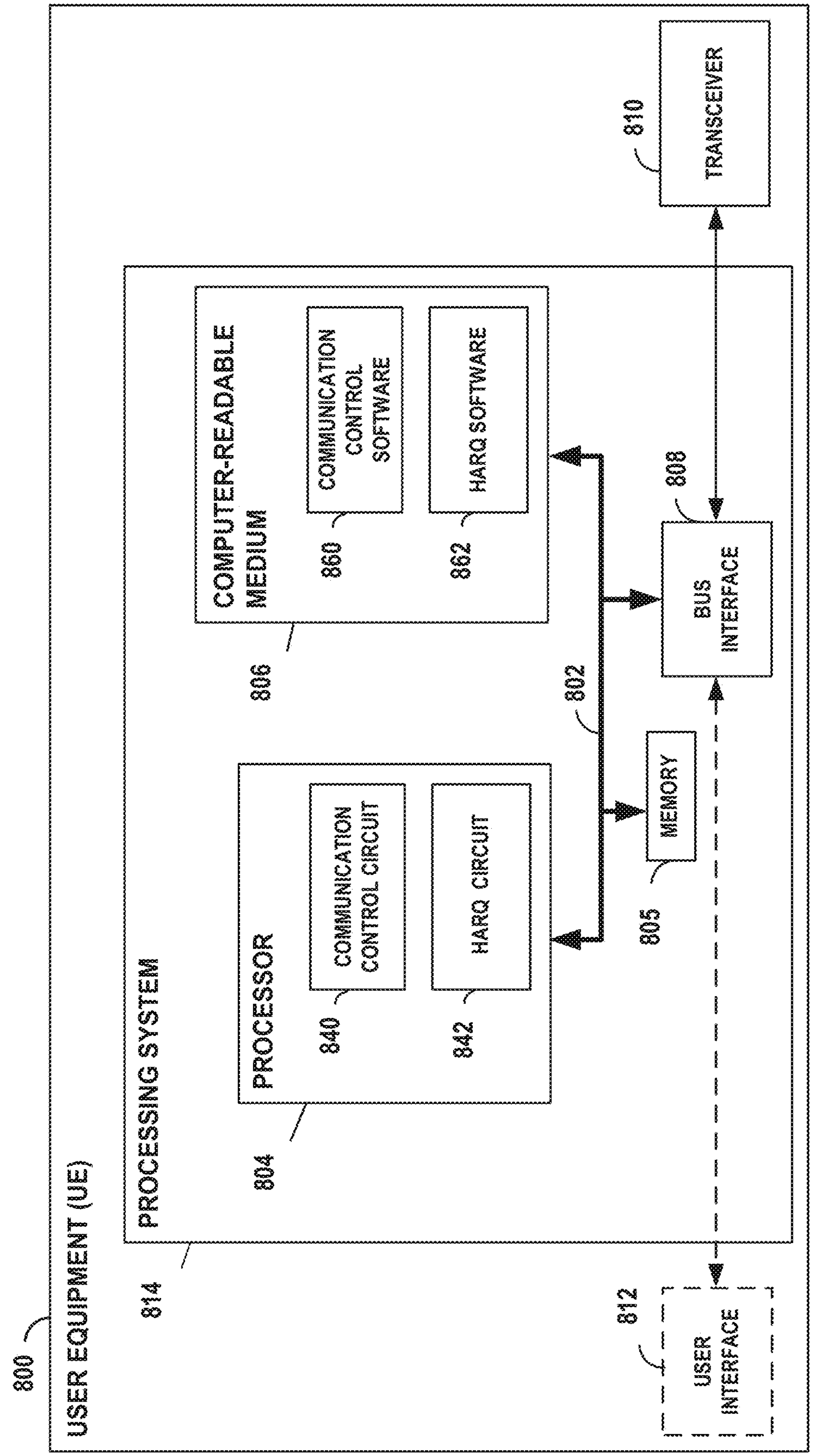
FIG. 8 is a block diagram conceptually illustrating an example of a hardware implementation for a user equipment (UE) according to some aspects of this disclosure.

FIG. 8 is a conceptual diagram illustrating an example of a hardware implementation for an exemplary scheduled entity 800 employing a processing system 814. In accordance with various aspects of the disclosure, a processing system 814 may include an element, or any portion of an element, or any combination of elements having one or more processors 804. For example, the scheduled entity 800 may be a user equipment (UE) as illustrated in any one or more of FIGS. 1, 2, 3, and/or 4.

The processing system 814 may be substantially the same as the processing system 714 illustrated in FIG. 7, including a bus interface 808, a bus 802, memory 805, a processor 804, and a computer-readable medium 806. Furthermore, the UE 800 may include a user interface 812 and a transceiver 810 substantially similar to those described above in FIG. 7. That is, the processor 804, as utilized in a UE 800, may be configured (e.g., in coordination with the memory 805) to implement any one or more of the processes described below and illustrated in FIGS. 16, 17, and/or 18.

In some aspects of the disclosure, the processor 804 may include communication control circuitry 840 configured (e.g., in coordination with the memory 805) for various functions, including, for example, communicating user data and/or control signaling to/from a network node 700. Communication control circuitry 840 may, for example, receive, decode, and interpret DCIs including resource scheduling information, determine resources to use for wireless communication, etc. The processor 804 may further include HARQ circuitry 842 configured (e.g., in coordination with the memory 805) for various functions, including, e.g., generating and transmitting HARQ-ACK feedback in response to a private codeword, a common codeword, or any other suitable codeword. Here, HARQ-ACK feedback may include ACK/NACK feedback for a private codeword, and NACK-only feedback for a common codeword.

And further, the computer-readable storage medium 806 may store computer-executable code that includes communication control software 860 that configures a UE 800 for various functions, including, e.g., communicating user data and/or control signaling to/from a network node 700. Communication control software 860 may, for example, receive, decode, and interpret DCIs including resource scheduling information, determine resources to use for wireless communication, etc. The computer-readable storage medium 806 may further store computer-executable code that includes HARQ software 862 that configures a UE 800 for various functions, including, e.g., generating and transmitting HARQ-ACK feedback in response to a private codeword, a common codeword, or any suitable codeword. Here, HARQ-ACK feedback may include ACK/NACK feedback for a private codeword, and NACK-only feedback for a common codeword.

In one configuration, an apparatus 800 for wireless communication includes means for receiving and means for transmitting. In one aspect, the aforementioned means may be the processor 804 shown in FIG. 8 configured to perform the functions recited by the aforementioned means. In another aspect, the aforementioned means may be a transceiver 810, or a circuit or any apparatus configured to perform the functions recited by the aforementioned means.

Figure 16:
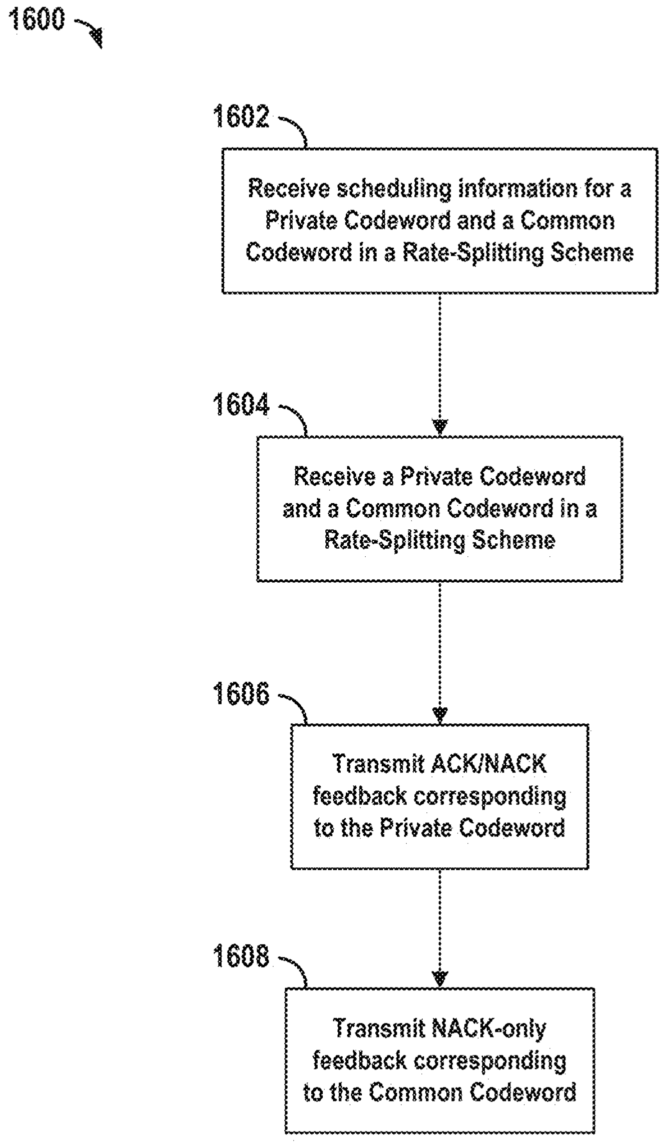
FIG. 16 is a flow chart illustrating an example of a process for using NACK-only feedback for a common codeword in a rate splitting scheme according to some aspects of this disclosure.
Figure 17:
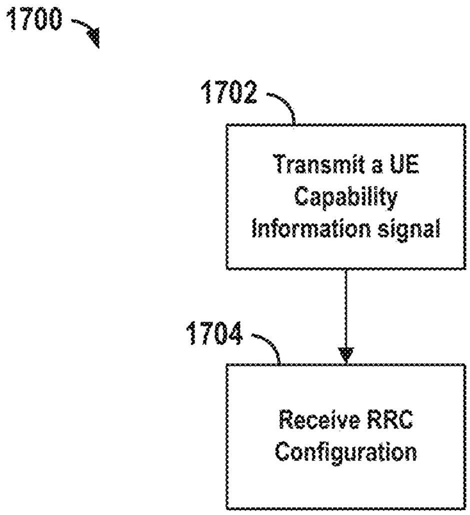
FIG. 17 is a flow chart illustrating an example of a process for configuring a UE for using NACK-only feedback for a common codeword in a rate splitting scheme according to some aspects of this disclosure.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 3, and/or 4, and utilizing, for example, the processes and/or algorithms described herein in relation to FIGS. 16, 17, and/or 18.

NACK-Only Feedback in a Multicast/Broadcast Systems (MBS)

In some data integrity feedback schemes, such as hybrid automatic repeat request (HARQ), introduced above, a receiving device transmits HARQ-ACK feedback as either an acknowledgment (ACK) indicating that a packet was properly decoded, or a negative acknowledgment (NACK) indicating that a packet was not properly decoded. Some aspects of the present disclosure forgo such an ACK/NACK scheme and instead opt for NACK-only feedback.

For a NACK-only configuration, the receiving device does not transmit feedback that would include only HARQ-ACK information with ACK values. For example, when the receiving device is a user equipment (UE), the UE may forgo to transmit a physical uplink control channel (PUCCH) if the PUCCH would only include ACK values. As one example, in the case of a single-bit HARQ-ACK, the receiving device would only transmit HARQ-ACK feedback when the HARQ-ACK information bit has a NACK value.

In 3GPP specifications for 5G NR, the radio access network (RAN) can use radio resource control (RRC) signaling to configure a UE between a first mode using ACK/NACK feedback, or a second mode using NACK-only feedback. These specifications for 5G NR indicate that the RAN configures the feedback mode per group-radio network temporary identifier (G-RNTI), which corresponds to a multicast-broadcast service (MBS) service type for a group of UEs.

When a UE is configured for NACK-only feedback, the PUCCH resource that a given UE uses for transmitting its NACK-only feedback can be shared by a plurality of UEs. That is, all UEs that decode a given transport block (TB) (a multicast physical downlink control channel (PDSCH) in the case of MBS) can use the same resource for transmission of their respective PUCCH, and transmit NACK-only feedback using that resource only if the TB is not successfully decoded. This way, if the RAN detects the PUCCH, it means that at least one UE has not successfully decoded the TB. In this event, the RAN can retransmit the TB via a multicast PDSCH retransmission.

According to 3GPP specifications for 5G NR, a UE may transmit NACK-only-based HARQ feedback using PUCCH format 0 or PUCCH format 1, with a cyclic shift of 0. The sequence cyclic shift for NACK-only feedback is $m_{cs}=0$, and set b(0)=0 for PUCCH Format 1 NACK-only. Note that the initial Cyclic Shift ($m_0$) is configured for PUCCH-format 0 and PUCCH-format 1 as legacy by RRC parameter "initial-CyclicShift". For PUCCH format 0, the applied cyclic shift is determined based at least in part on $m_0$-$m_{cs}$, where $m_{cs}=0$ is assumed in case of NACK-only feedback. For PUCCH format 1, the RRC configured cyclic shift is applied ($m_0$), but the information bit to generate the PUCCH sequence is assumed to be b(0)=0 in the case of NACK-only feedback.

From the UE's perspective, the PUCCH resource configuration for HARQ-ACK feedback for MBS is separate from that of unicast. UEs transmitting NACK-only based HARQ-ACK feedback can share the PUCCH resource.

In some cases, more than one NACK-only based feedback are available for transmission in the same PUCCH slot. For example, a single PUCCH carrying NACK-only feedback may carry feedback corresponding to a plurality of TBs. In some aspects, the PUCCH format for HARQ feedback can depend on the upper-layer parameter moreThanOneNack-OnlyMode.

For example, if moreThanOneNackOnlyMode is not configured, then the UE may multiplex HARQ-ACK bits by transforming NACK-only into ACK/NACK HARQ bits (i.e., a first mode). Otherwise, if moreThanOneNack-OnhMode is configured, a UE may use up to 15 orthogonal PUCCH resources to select from according to combinations of up to 4 TBs with NACK-only feedback (see FIG. 9).

FIG. 9 is a table 900 showing PUCCH resource selection for 1, 2, 3, or 4 bits of NACK-only feedback. In the first four columns, a value of 0 represents NACK. For example, in the first column, representing PUCCH resource selection for one bit NACK-only feedback, if the UE is to send the NACK-only feedback, then the UE selects the $1^{st}$ PUCCH resource from a configured resource list. If the UE properly receives and decodes the corresponding TB, then the UE does not transmit feedback on a PUCCH resource.

In cases of more than one bit, the selection of which PUCCH resource for the UE to use for its HARQ-ACK feedback depends on the ACK/NACK values. In all cases, if all TBs are properly received and decoded, then the UE does not transmit feedback on a PUCCH resource.

For example, for 2 bits, representing NACK-only feedback for 2 TBs, there is only a transmission if at least one of the bits corresponds to NACK (0). If both TBs are not properly decoded, then the NACK-only feedback is {0,0}, and the UE selects the $1^{st}$ PUCCH resource from a configured resource list. The UE selects the $2^1$ PUCCH resource when the NACK-only feedback is {1,0} (indicating that the second TB was not properly decoded), and the UE selects the $3^{rd}$ PUCCH resource when the NACK-only feedback is (0,1) (indicating that the first TB was not properly decoded). Again, there is no transmission if both bits correspond to ACK.

In an aspect of the disclosure, different PUCCH resources in the configured resource list may correspond to different cyclic shifts of a known sequence, or different RBs, or different symbols used for transmission of the feedback. In various aspects, any suitable set of PUCCH resources may be configured as long as they are differentiated from one another.

By employing such NACK-only feedback, a RAN may reduce PUCCH overhead across multiple UEs. That is, when a given UE properly receives and decodes a packet, or a set of packets, then the UE may forgo transmission of HARQ-ACK feedback. This can also result in power saving at the UE, again, since there is no need to transmit the PUCCH in the case of ACK. Further, NACK-only feedback can reduce inter-cell interference due to fewer PUCCH transmissions across multiple UEs in a cell.

Rate Splitting

Figure 10:
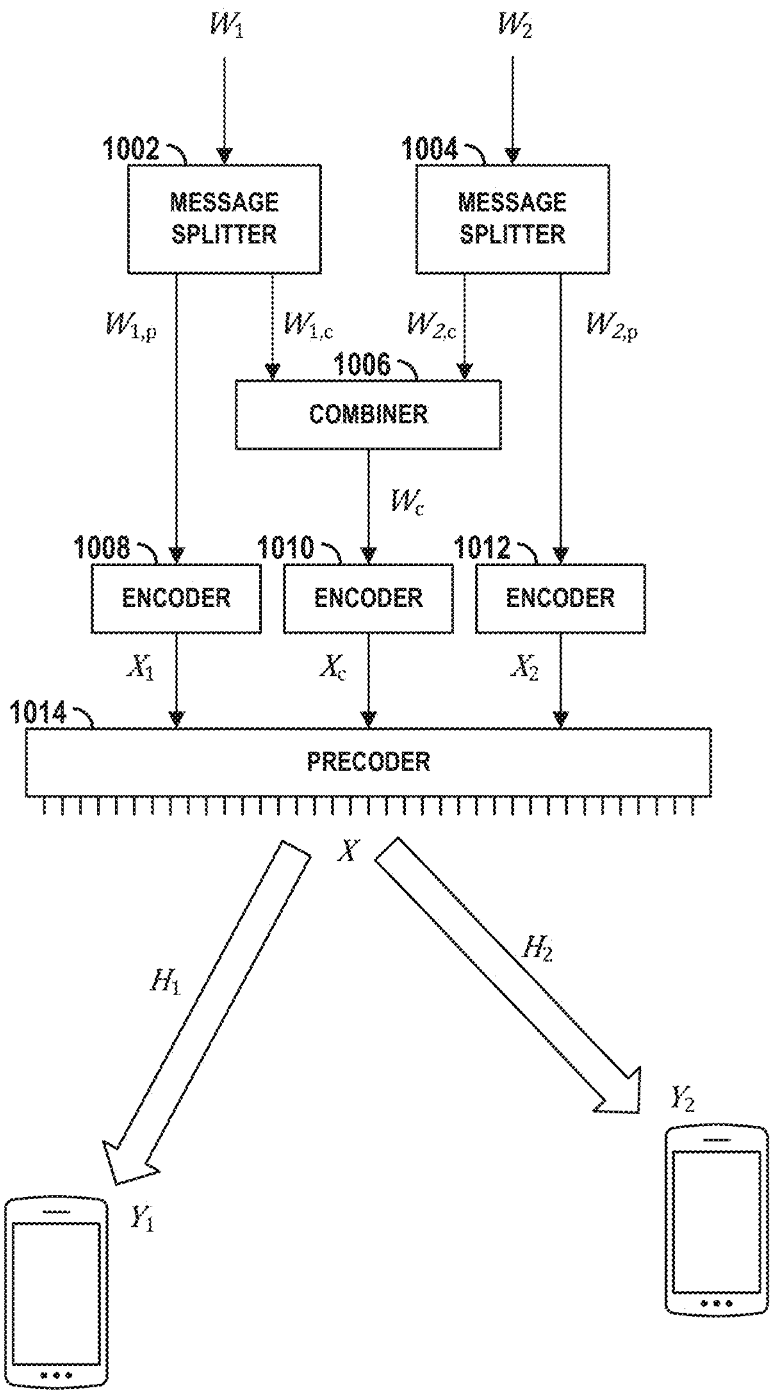
FIG. 10 is a block diagram illustrating an encoding operation in a rate splitting scheme according to some aspects of this disclosure.

Rate splitting techniques have gained recent interest as a candidate for advanced interference management in 5G Advanced or 6G wireless communication systems. FIG. 10 is a schematic illustration of functional operations of a rate splitting scheme at a transmitting device, such as a network node. In FIG. 10, a network node encodes and transmits messages for two UEs, although in other examples, a network node may encode and transmit messages for any number of UEs.

As illustrated in FIG. 10, a network node may split one or more individual UEs' messages into a common part for transmission in a common codeword, and a private part including a private codeword. Although the illustrated system performs rate splitting for two UEs' messages, rate splitting may be performed for any number of UEs, and the following example describes a scenario with two UEs for ease of description. For example, a first message splitter 1002 and a second message splitter 1004 may split a first message for a first UE $W_1$ and a second message for a second UE $W_2$, into a common part ($W_{1,c}$ and $W_{2,c}$) and a private part ($W_{1,p}$ and $W_{2,p}$), respectively. A combiner 1006 concatenates or otherwise combines the common parts of the individual messages for the first and second UEs (e.g., $W_{1,c}$ and $W_{2,c}$) into a common codeword We, which is encoded and modulated to generate a common stream $X_e$.

Although the illustrated combiner 1006 combines the common parts of messages for two UEs, the common codeword We may include a portion of any number of one or more individual UE's messages. For example, when the common codeword We includes information for only a single UE, other UEs receiving the rate-splitting transmission may still receive and decode the common codeword for purposes of interference cancellation.

Encoders 1008 and 1012 separately encode and modulate the private parts of the individual messages (e.g., private codewords $W_{1,p}$ and $W_{2,p}$) are separately encoded and modulated to generate private streams ($X_1$ and $X_2$) for the corresponding UEs. Precoder 1014 jointly precodes the private streams $X_1$ and $X_2$ and the common stream Xc for downlink transmission to generate the transmitted signal $X=P_cX_c+P_1X_1+P_2X_2$. Here, $P_n$ represents the precoder applied for the corresponding stream.

In general, as described above, precoding is based on channel knowledge (e.g., channel estimation based on measured reference signals). With perfect channel knowledge at the network node, interference from other users' streams can be perfectly separated out from the received signal at the UE. But when channel knowledge is imperfect, other users' streams interfere with one another at each of the receiving UEs. As described further below, a receiving UE can use the common stream to remove interference from other users' streams, from that UE's stream. This interference cancellation is an advantage of rate splitting as discussed herein.

Figure 11:
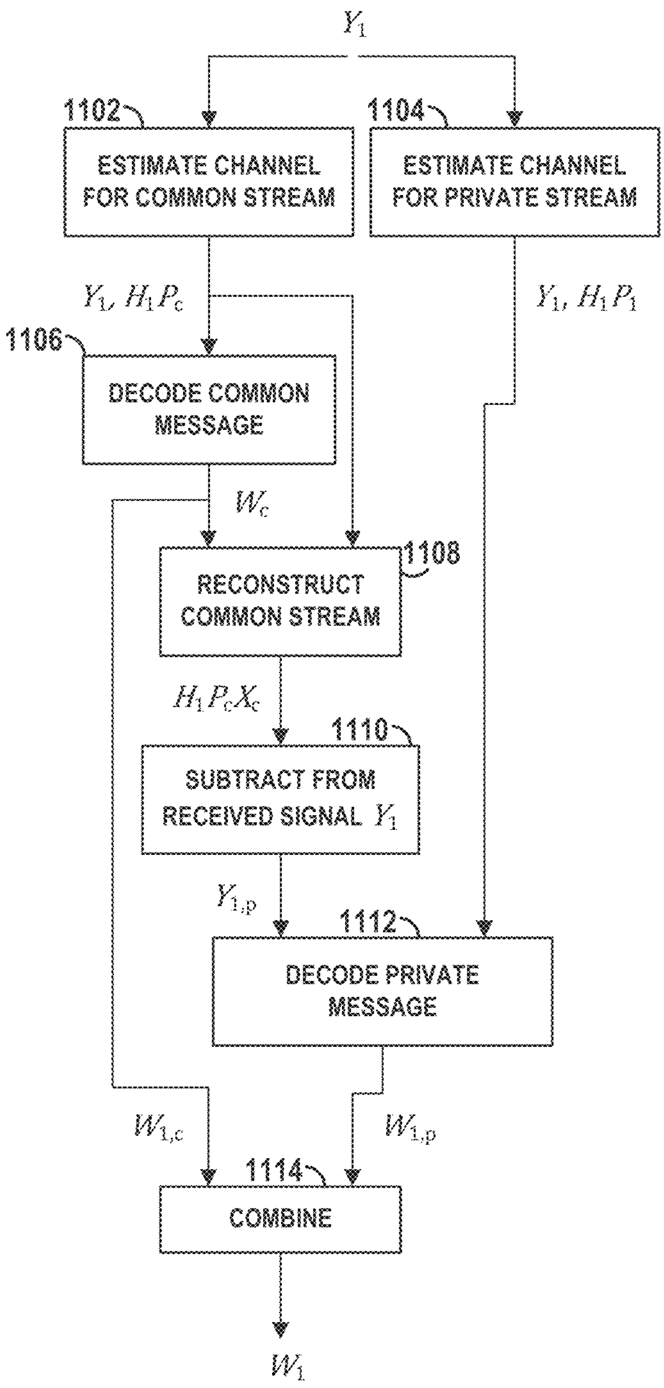
FIG. 11 is a block diagram illustrating a decoding operation in a rate splitting scheme according to some aspects of this disclosure.

FIG. 11 is a schematic illustration of an example of functional operations of a rate splitting scheme at a receiving device, such as a UE. In FIG. 11, a UE (arbitrarily designated $UE_1$) receives a transmission encoded as described above using a rate splitting scheme.

Thus, the received signal at $UE_1$, $Y_1=H_1X$ where $H_1$ is the channel between the network node and $UE_1$ and X again represents the signal as transmitted by the network node. As in the example in FIG. 10, the signal X includes a common stream $X_c$ and at least one private stream directed to $UE_1$, designated as $X_1$. In the example where the transmission includes two private streams $X_1$ and $X_2$, $Y_1=H_1X=H_1P_cX_c+H_1P_1X_1+H_1P_2X_2+N_1$, where $N_1$ represents noise in the received signal. Again, Pc represents the precoding applied to the common stream $X_c$, $P_1$ represents the precoding applied to the first private stream $X_1$; and $P_2$ represents the precoding applied to the second private stream $X_2$.

The receiving UE may demodulate and decode the received transmission using any of several suitable techniques. For example, the UE may use joint demodulation, wherein the UE jointly demodulates the private stream $X_1$ and the common stream $X_c$, and separately decodes the private codeword and the common codeword. In another example, as illustrated in FIG. 11, a UE may employ successive interference cancellation (SIC) for demodulation and decoding of the received transmission.

In a SIC example, as illustrated in FIG. 11, at block 1102, a UE first performs channel estimation for the common stream, to estimate the effective channel ($H_1P_c$) corresponding to the common stream. At block 1106, the UE then decodes the common stream $X_c$ to obtain the common codeword $W_c$. With the common codeword, the UE obtains that part of its individual message that was contained in the common codeword ($W_{1,c}$). In the example illustrated in FIG. 11, the UE uses the common codeword for successive interference cancellation (SIC).

For example, at block 1108 the UE re-encodes the common codeword We to reconstruct the common stream $X_c$. The UE then multiplies the reconstructed common stream $X_c$ by the estimated effective channel to obtain $H_1P_cX_c$. At block 1110 the UE then subtracts this product $H_1P_cX_c$ from the received signal $Y_1$.

Assuming perfect channel estimation, and successful decoding of the common codeword, subtracting this value completely cancels the common stream from the received signal. This results in the private codeword of the received signal $Y_{1p}=Y_1-H_1P_cX_c=H_1P_1X_1+H_1P_2X_2+N_1$.

At block 1104 the UE performs channel estimation for the private stream, to estimate the effective channel ($H_1P_1$) corresponding to the private stream. Here, at block 1112 the UE decodes the private stream $X_{1p}$ to obtain the private part of the message $W_{1,p}$ using the private part of the received signal $Y_{1,p}$, hence enhancing the probability of decoding the private message as part of the interference (from common codeword) is removed. The UE can then combine the decoded messages $W_{1,c}$ and $W_{1,p}$ to obtain the message $W_1$ for the first UE $UE_1$.

Rate splitting, such as described above, can achieve a larger degree of freedom or capacity in a MU-MIMO cell. Moreover, signal integrity is improved via interference cancellation. That is, a UE does not need to fully rely on perfect channel knowledge; part of the interference is received by the UE as part of its intended signal.

Combining NACK-Only Feedback with Rate Splitting

According to various aspects, the present disclosure provides for NACK-only feedback for the common codeword in a rate splitting scheme. With this technique, the reduced overhead, reduced interference, and UE power savings of NACK-only feedback discussed for Rel-17 MBS can be also realized for the common codeword in rate splitting. This is because in both the cases of MBS and rate splitting, a common transport block is decoded by multiple UEs.

In rate splitting MIMO, when a common codeword is decoded by multiple UEs, according to some aspects of the disclosure, separate DCIs may be used for scheduling the common codeword versus the private codeword. In these aspects, the DCI that schedules the common codeword can be a group-common DCI (scrambled with G-RNTI, similar to MBS). In this case, the Rel-17 MBS procedures including NACK-Only feedback can be reused for the common codeword in rate splitting.

However, in an example where a single DCI is used to schedule both the common codeword and the private codeword (both as part of a single scheduled PDSCH, e.g., the PDSCH incudes multiple codewords), more procedural changes are called for. However, using a single DCI to schedule the common codeword and the private codeword can save on DCI overhead. This is because most scheduling parameters (e.g., time-domain resource allocation or frequency-domain resource allocation (TDRA/FDRA), etc.) are the same for both the common codeword and the private codeword.

In some aspects of this disclosure, a UE that is scheduled with a private codeword and common codeword in a rate splitting scheme can send the HARQ-ACK feedback in two separate PUCCH resources: a first PUCCH resource and a second PUCCH resource. The first PUCCH resource is for transmitting the HARQ-ACK feedback associated with the private codeword, with ACK/NACK feedback. Below, this use of ACK/NACK feedback is referred to as a first feedback reporting mode. The second PUCCH resource is for transmitting the HARQ-ACK feedback associated with the common codeword, and is a NACK-only PUCCH resource. Below, this use of NACK-only feedback is referred to as a second feedback reporting mode. In some examples, a UE may indicate its support of this mode of operation (i.e., transmitting feedback on two different PUCCH resources) by transmitting suitable UE capability signaling indicating this support.

The second PUCCH resource, similar to the case for MBS, may be PUCCH format 0 or 1, and cyclic shift 0 may be used to transmit the PUCCH. The UE may transmit the second PUCCH resource if the common codeword is not correctly decoded by the UE.

In some cases, the second PUCCH resource may carry feedback for multiple common codewords. For example, different common codewords may be scheduled at different times for the UE, but the feedback may be combined into a single PUCCH. In this case, a network node (e.g., a gNB) may configure the UE to utilize one of two different behaviors. In a first example, the UE may be configured to transform the NACK-only feedback into ACK/NACK HARQ bits. In this case, the second PUCCH resource may be transmitted to indicate ACK or NACK bits corresponding to the multiple common codewords. In a second example, similar to the NACK-only scheme described above and illustrated in FIG. 9, the second PUCCH resource for carrying NACK-only feedback may be selected from a list (i.e., a list specific to this NACK-only scheme) of PUCCH resources based on decoding results of the multiple common codewords.

In some examples, the second PUCCH resource for carrying the NACK-only feedback may be the same across multiple co-scheduled UEs that decode the common codeword. That is, a network node may align the second PUCCH resource across multiple UEs participating in the rate splitting scheme.

Separate DCIs May Schedule Common and Private Codewords

According to some aspects, a network node implementing rate splitting may schedule a common codeword for a given UE using a separate DCI than the network node uses for scheduling a private codeword for that same UE. In this case, the private codeword and the common codeword may be transmitted on different PDSCHs, and HARQ-ACK feedback for the separate PDSCHs may be scheduled in their corresponding DCIs.

Figure 12:
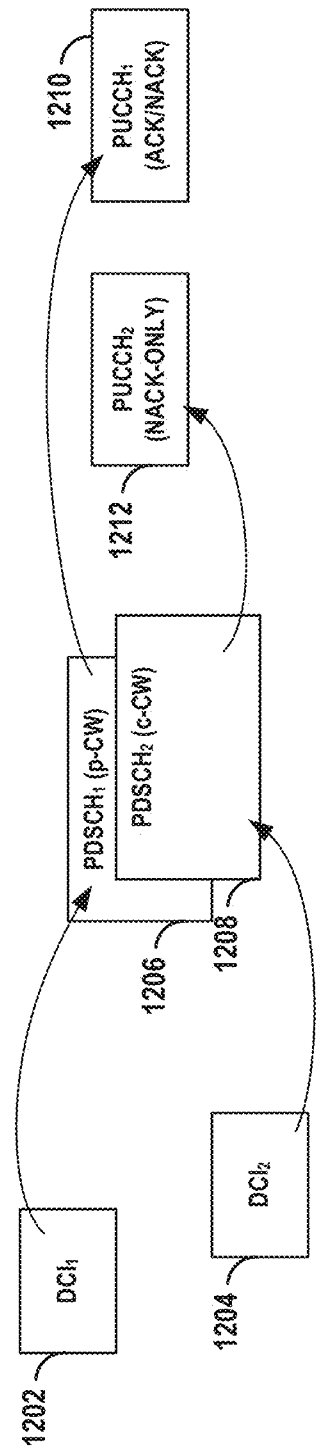
FIG. 12 is a schematic illustration of separately-scheduled private and common codewords according to some aspects of this disclosure.

FIG. 12 is a schematic illustration showing separate DCIs scheduling a private codeword (p-CW) and a common codeword (c-CW) according to some aspects of this disclosure. As illustrated, a first DCI, $DCI_1$ 1202 schedules a first PDSCH, $PDSCH_1$ 1206, for carrying a private codeword; and a second DCI, $DCI_2$ 1204 schedules a second PDSCH, $PDSCH_2$ 1208 for carrying a common codeword. Although this example shows a single DCI-PDSCH-PUCCH sequence, this is not necessarily the case. For example, multiple DCIs may schedule separate PDSCHs that share a PUCCH resource for HARQ-ACK feedback.

In some examples, the first DCI, $DCI_1$ 1202 may be unicast, directed to a particular UE. For example, the first DCI, DCLI 1202 may have a CRC scrambled with a cell-radio network temporary identifier (C-RNTI), indicating that the DCI is dedicated to a particular UE (i.e., the UE receiving the private codeword). Further, the first DCI, $DCI_1$ 1202 may include one or more HARQ-ACK parameters providing for the UE to determine an uplink resource ($PUCCH_1$) for the UE to use for transmission of HARQ-ACK feedback. For example, the first DCI. DCIs 1202 may include a parameter K1 that indicates a slot offset, indicating a number of slots after the PDSCH (PDSCHs) 1206 where the UE has a PUCCH resource ($PUCCH_1$) 1210 for transmitting HARQ-ACK information corresponding to the first PDSCH, $PDSCH_1$ 1206. The first DCI, $DCI_1$ 1202 may further include a PUCCH resource indicator (PRI) parameter that identifies the PUCCH resource within the identified slot where the UE can transmit HARQ-ACK feedback.

In further examples, the second DCI, $DCI_2$ 1204 may be groupcast, directed to a group of UEs. For example, the second DCI, $DCI_2$ 1204 may have a CRC scrambled with a group-radio network temporary identifier (G-RNTI), indicating that the second DCI is directed to a group of UEs that share the G-RNTI (i.e., the UEs receiving the common codeword). Further, the second DCI, $DCI_2$ 1204 may include one or more HARQ-ACK parameters providing for the UEs that share the G-RNTI to determine an uplink resource ($PUCCH_2$) 1212 for the UEs to use for transmission of NACK-only HARQ-ACK feedback. For example, the second DCI, $DCI_2$ 1204 may include a parameter K1 that indicates a slot offset, indicating a number of slots after the PDSCH ($PDSCH_2$) 1208 where the UEs have a PUCCH resource ($PUCCH_2$) 1212 for transmitting NACK-only HARQ-ACK information corresponding to the second PDSCH, $PDSCH_2$ 1208. The second DCI, $DCI_2$ 1204 may further include a PRI that identifies the PUCCH resource within the identified slot where the UEs can transmit the NACK-only HARQ-ACK feedback.

In the schematic illustration of FIG. 12, the first PDSCH ($PDSCH_1$) 1206 and the second PDSCH ($PDSCH_2$) 1208 are shown partially overlapping, but this is not necessarily the case. In various examples, the first and second PDSCHs are separately scheduled, and may fully or partially overlap, or may be separated from one another.

A UE that receives a private codeword and a common codeword may attempt to decode the respective codewords, e.g., as described above with reference to FIG. 11. The corresponding UE may then generate HARQ-ACK data for the respective codewords (e.g., ACK/NACK data for the private codeword and NACK-only data for the common codeword). The UE may then transmit the generated HARQ-ACK feedback in the allocated PUCCH resources for the respective codewords. Here, as described above, in some cases the UE may forgo transmitting on the second PUCCH resource $PUCCH_2$ 1212 in the case where the UE properly received and decoded all TBs contained in the common codeword.

Figure 13:
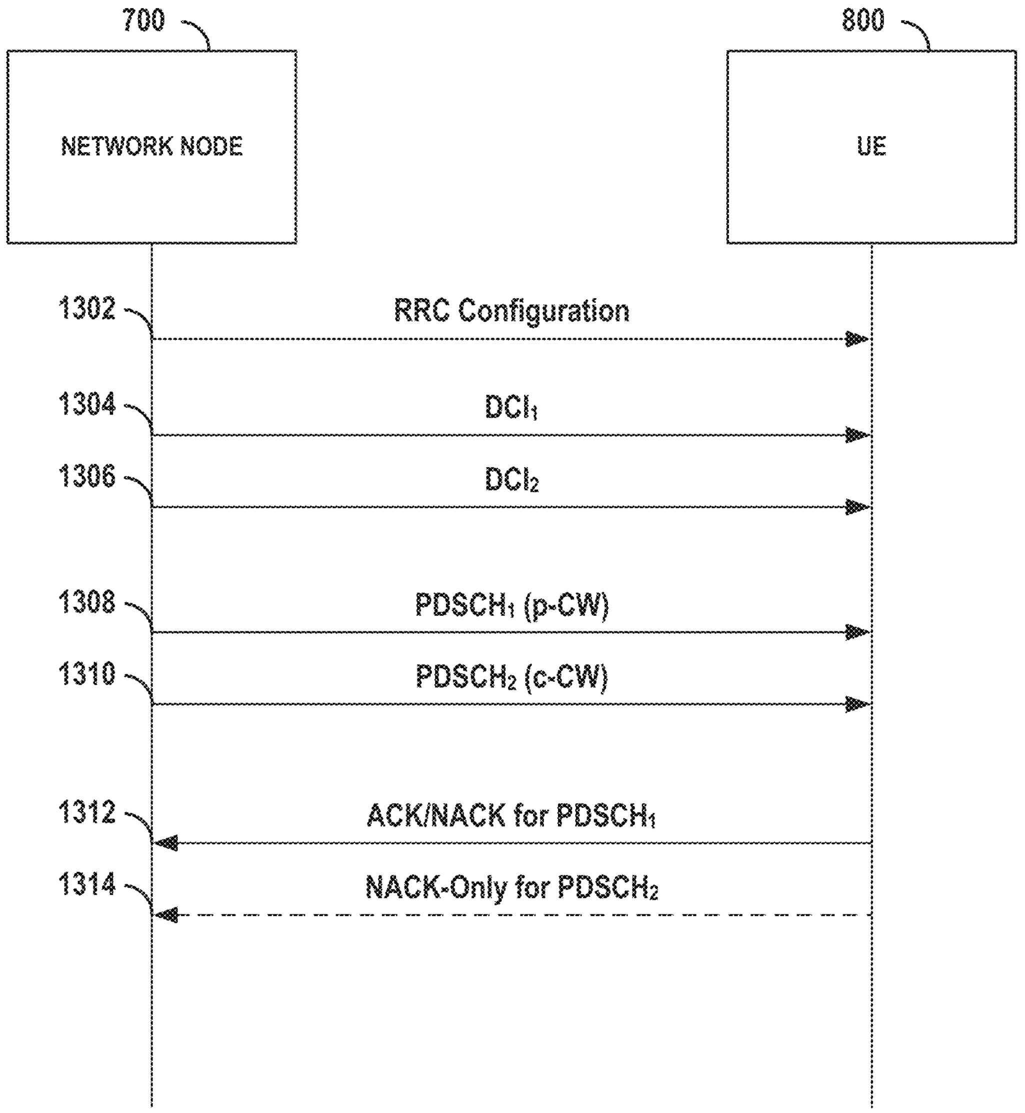
FIG. 13 is a call flow diagram illustrating separately-scheduled private and common codewords according to some aspects of this disclosure.

FIG. 13 is a call flow diagram illustrating an example of a process for a network node communicating with a UE and employing NACK-only feedback for a common codeword in a rate splitting scheme. In some examples, the network node may be the network node 700 described above and illustrated in FIG. 7, and the UE may be the UE 800 described above and illustrated in FIG. 8.

Based for example on a UE's indicated capability to use NACK-only feedback for a common codeword in a rate splitting scheme, a network node 700 may transmit RRC configuration signaling 1302 to configure the UE 800 to use NACK-only feedback for a common codeword. In this example, the network node 700 may transmit a first DCI ($DCI_1$) 1304 scheduling a private codeword, and a second DCI ($DCI_2$) 1306 scheduling a common codeword in a rate splitting scheme. As described above, these scheduling DCIs 1304 and 1306 may further allocate resources for the UE 800 to transmit HARQ-ACK feedback in response to the private and common codewords.

The network node 700 may transmit a private codeword 1308 according to the first DCI 1304, and may transmit a common codeword 1310 according to the second DCI 1306. When the UE 800 receives and decodes the private codeword 1308 and common codeword 1310, the UE may perform an integrity check (e.g., CRC) to determine if the respective codewords were properly received. According to an aspect of the present disclosure, the UE 800 may transmit HARQ-ACK feedback using a first HARQ-ACK reporting mode (ACK/NACK feedback) based on the private codeword 1308 (1312), and the UE 800 may transmit HARQ-ACK feedback using a second HARQ-ACK reporting mode (NACK-only feedback) based on the common codeword 1310 (1314). As described above, these HARQ-ACK messages 1312 and 1314 may be carried on resources indicated in the scheduling DCIs 1304 and 1306, respectively.

A Single DCI May Schedule Both Common and Private Codewords

According to some aspects, a network node implementing rate splitting may use a single DCI to allocate resources for both a private codeword and a common codeword. In this case, the private codeword and the common codeword may be transmitted on the same PDSCH or on different PDSCHs. HARQ-ACK feedback for the private codeword may use a first HARQ-ACK reporting mode (i.e., ACK/NACK), and HARQ-ACK feedback for the common codeword may use a second HARQ-ACK reporting mode (i.e., NACK-only).

Figure 14:
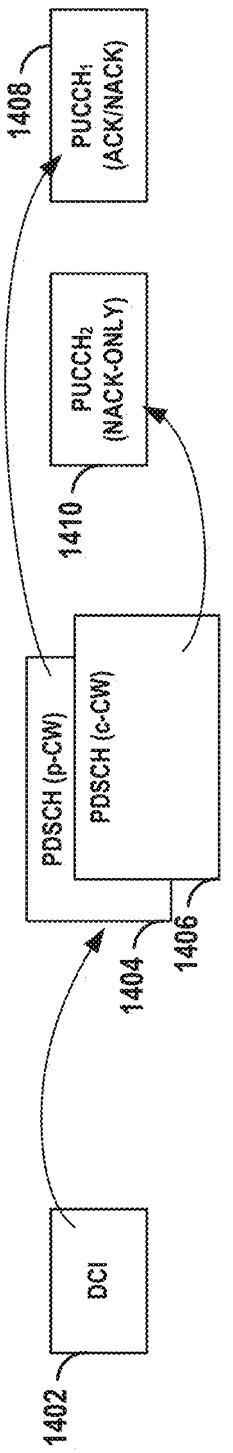
FIG. 14 is a schematic illustration of jointly scheduled private and common codewords according to some aspects of this disclosure.

FIG. 14 is a schematic illustration showing a single DCI scheduling a private codeword (p-CW) and a common codeword (c-CW) according to some aspects of this disclosure. As illustrated, a DCI 1402 schedules a PDSCH including a common codeword 1404 and a private codeword 1406. For example, the DCI 1402 may include separate resource allocations for the private codeword 1404 and for the common codeword 1406. In another example, the DCI may include one resource allocation for both the private codeword 1404 and the common codeword 1406. In either case, the DCI 1402 may include separate scheduling parameters for the private codeword 1404 and common codeword 1406, including but not limited to their modulation and coding scheme (MCS), their new data indicator (NDI), their redundancy version (RV), etc. Similar to the above example, while FIG. 14 illustrates a single DCI-PDSCH-PUCCH sequence, this is not necessarily the case. For example, multiple DCIs may schedule separate PDSCHs that share a PUCCH resource for HARQ-ACK feedback.

In some examples, the DCI 1402 scheduling the private codeword 1404 and the common codeword 1406 can be configured to request HARQ-ACK feedback based on the second HARQ-ACK reporting mode (NACK-only mode) for the common codeword 1406. That is, the scheduling DCI 1402 may include a dynamic indication of a HARQ-ACK reporting mode for a common codeword 1406. For example, the DCI 1402 may include a new DCI field representing a HARQ-ACK reporting mode for the common codeword 1406. In some examples, a UE may signal to the network its capability of interpreting such a new DCI field representing a HARQ-ACK reporting mode for the common codeword 1406 using any suitable UE capability signaling. In this way, some UEs in a network may use NACK-only feedback for the common codeword 1406 while other UEs in the network may use conventional ACK/NACK feedback for the common codeword 1406. When such a UE indicates its capability of interpreting the new DCI field representing a HARQ-ACK reporting mode for the common codeword 1406, a network node may employ any suitable signaling, such as but not limited to RRC signaling, to configure that UE for NACK-only feedback for the common codeword 1406. The configuration of a UE for NACK-only feedback for the common codeword 1406 may be, for example, per bandwidth part (BWP), per component carrier (CC), or per DCI format. That is, the network node may be configured to separately configure a DCI having a first format (e.g., DCI format 1_1) to indicate for a UE to use NACK-only feedback for the common codeword 1406, and to configure a DCI having a second format (e.g., DCI format 1_2) to indicate for the UE to use ACK/NACK feedback for the common codeword 1406.

In another example, a network node may utilize higher-layer signaling (e.g., RRC signaling) to configure a UE to utilize either the first HARQ-ACK reporting mode or the second HARQ-ACK reporting mode for the common codeword 1406. That is, the DCI 1402 need not necessarily include an indication of the HARQ-ACK reporting mode for the UE to use for the common codeword 1406. Here, an RRC indication that rate splitting is being used, or that the common codeword will be present, may be separate from an RRC indication of the HARQ-ACK reporting mode for the UE to use for the common codeword 1406.

Figure 15:
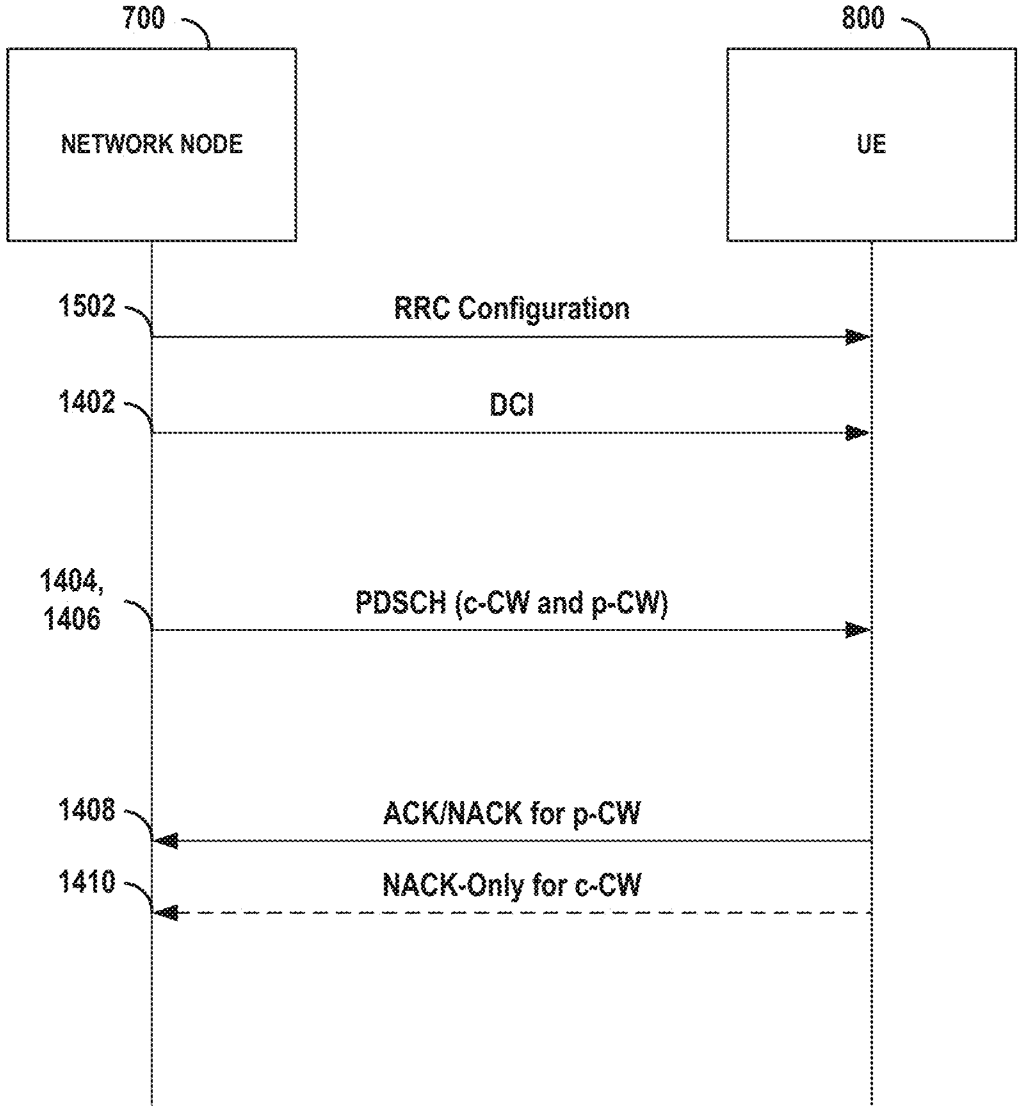
FIG. 15 is a call flow diagram illustrating jointly scheduled private and common codewords according to some aspects of this disclosure.

FIG. 15 is a call flow diagram illustrating an example of a process for a network node communicating with a UE and employing NACK-only feedback for a common codeword in a rate splitting scheme. In some examples, the network node may be the network node 700 described above and illustrated in FIG. 7, and the UE may be the UE 800 described above and illustrated in FIG. 8.

Based for example on a UE's indicated capability to use NACK-only feedback for a common codeword in a rate splitting scheme, a network node 700 may transmit RRC configuration signaling 1502 to configure the UE 800 to use NACK-only feedback for a common codeword. In this example, the network node 700 may transmit a DCI 1402 scheduling a private codeword and a common codeword. As described above, this scheduling DCI 1402 may further allocate resources for the UE 800 to transmit HARQ-ACK feedback in response to the private and common codewords.

The network node 700 may transmit a PDSCH according to the DCI 1402, the PDSCH including a common codeword 1406 and a private codeword 1404 in a rate splitting scheme. When the UE 800 receives and decodes the private codeword 1404 and common codeword 1406, the UE may perform an integrity check (e.g., CRC) to determine if the respective codewords were properly received. According to an aspect of the present disclosure, the UE 800 may transmit HARQ-ACK feedback using a first HARQ-ACK reporting mode (ACK/NACK feedback) based on the private codeword 1404 (1408), and the UE 800 may transmit HARQ-ACK feedback using a second HARQ-ACK reporting mode (NACK-only feedback) based on the common codeword 1406 (1410). As described above, these HARQ-ACK messages 1408 and 1410 may be carried on resources indicated in the scheduling DCI 1402.

As described above, the network node 700 may use the DCI 1402 to indicate resources not only for the PDSCH 1404/1406, but further to indicate resources for the HARQ-ACK feedback 1408/1410. According to a further aspect of this disclosure, there are several options for how the network node 700 indicates, and how the UE 800 identifies, the PUCCH resources for the UE 800 to use for the HARQ-ACK feedback 1408/1410. There are two parameters that the network node 700 should convey to the UE 800: the UE 800 first needs to identify the slot(s) that will carry the respective HARQ-ACK feedback 1408/1410. And once the slot(s) are identified, the UE 800 then needs to identify the resource(s) within those slots to use for the HARQ-ACK feedback 1408/1410.

Determining a Slot for PUCCH Resources

There are two PUCCH resources that separately carry HARQ-ACK feedback for the private codeword and for the common codeword, respectively. For the first PUCCH resource (i.e., the resource for the ACK/NACK feedback for the private codeword 1404), any suitable slot assignment procedure may be followed. For example, the DCI 1402 may include a PDSCH-to-HARQ feedback timing indicator field, frequently referred to as a K1 parameter, that indicates the number of slots between the scheduled PDSCH and the corresponding PUCCH. According to an aspect of this disclosure, then, the DCI 1402 may include a slot assignment for the private codeword 1404 and a slot offset parameter K1 indicating a slot offset between the private codeword 1404 and the first PUCCH resource (i.e., the resource for the ACK/NACK feedback for the private codeword 1404). The UE 800 may accordingly determine the slot to use for the first PUCCH resource based on the slot assignment for the private codeword 1404 and based on the slot offset parameter K1.

For the second PUCCH resource (i.e., the resource for the NACK-only feedback for the common codeword 1406), there may be several options for how the UE determines the slot assignment. For example, the slot assignment for the second PUCCH resource may be based on an RRC configured value, may be the same as the slot of the first PUCCH resource, or the DCI 1402 may explicitly indicate the slot of the second PUCCH resource, which can be different from that of the first PUCCH resource. In the case that multiple such options are specified, the UE 800 may employ UE capability signaling and RRC configuration signaling to determine which option is supported by the UE and which option is configured.

For example, according to one aspect, the slot offset for the second PUCCH resource may be based on an RRC configured value. That is, RRC signaling (e.g., RRC configuration message 1502) may include a slot offset value, or "K1-value," configuring a slot offset for the second PUCCH resource relative to a slot assignment for the common codeword 1406. In this case, the DCI 1402 that schedules the common codeword 1406 need not include information about the slot assignment for the second PUCCH resource. This can simplify network scheduling across multiple UEs given that the slot offset is the same for all co-scheduled UEs (i.e., the common codeword is the same for co-scheduled UEs, and the NACK-only PUCCH resource is the same for co-scheduled UEs). That is, rather than indicating the slot offset or slot assignment for multiple UEs that receive and decode the common codeword 1406, the slot offset or K-value may be RRC configured, such that the K-value is relatively fixed and is the same across multiple UEs. Moreover, because the DCI 1402 need not include information about the slot offset or slot assignment for the second PUCCH resource 1410, signaling overhead can be reduced.

In another example according to a further aspect, the slot offset for the second PUCCH resource may be configured to be the same as the slot offset for the first PUCCH resource. That is, as discussed above, the DCI 1402 may include a K1 parameter indicating a slot offset for the first PUCCH resource 1408, relative to the private codeword. In this example, the UE 800 may assume that the same slot identified for the first PUCCH resource 1408 is also the slot for the second PUCCH resource 1410. In this example, the UE 800 may transmit both PUCCH resources 1408 and 1410 in the same slot. In some examples, the separate PUCCH resources 1408 and 1410 may be time division multiplexed within the slot, although any suitable multiplexing scheme may be used within the scope of the present disclosure.

In another example according to a still further aspect, the DCI 1402 may include an explicit indication of the slot assignment or slot offset for the second PUCCH resource (i.e., the resource for the NACK-only feedback 1410). This example provides the flexibility for the network node 700 to schedule the NACK-only PUCCH resource 1410 in a different slot compared to the ACK/NACK PUCCH resource 1408, at the cost of additional signaling overhead in the DCI 1402. For example, the DCI 1402 may include a separate, second K1 field for this purpose. In another example, a joint K1 field may indicate both the first slot offset and the second slot offset for the first PUCCH resource and the second PUCCH resource, respectively. That is, the joint K1 field may include a value corresponding to two separate slot offsets, and the UE 800 may use a lookup table to determine the first slot offset and the second slot offset based on the joint K1 field.

For the second PUCCH resource (i.e., the resource for the NACK-only feedback 1410), the indicated slot offset may in some examples be an offset with respect to the slot assignment for the common codeword 1406 (i.e., an absolute slot offset relative to the scheduled PDSCH, similar to the legacy resource determination procedure). In another example, the indicated slot offset for the second PUCCH resource may be an offset relative to the slot determined for the first PUCCH resource (i.e., the resource for the ACK/NACK feedback 1408). In this example, the slot offset indicated for the second PUCCH resource may take a positive or negative value, such that the second PUCCH resource 1410 can be positioned before or after the first PUCCH resource 1408.

A network node 700 may utilize RRC signaling 1502 to configure the DCI 1402 to include or not to include the second K1 value, or the joint K1 field. In some examples, the network node 700 can utilize the RRC signaling 1502 to separately configure the K1 values or the joint K1 value per bandwidth part (BWP), per component carrier (CC), or per DCI format. For example, an explicit indication of a slot offset for the second PUCCH resource for NACK-only feedback may be separately configured for DCI format 1_1 versus DCI format 1_2.

Determining an Identified Resource for a PUCCH

Once the slot or slots for the first and second PUCCH resources are determined, the UE 800 may then determine the resource within the identified slot to use for the HARQ-ACK feedback. For the first PUCCH resource (i.e., the resource for the ACK/NACK feedback 1408 for the private codeword 1404), any suitable resource assignment procedure may be followed. For example, the DCI 1402 may include a PUCCH resource indicator (PRI) field that the UE 800 can employ to determine the first PUCCH resource. The PRI field points to a PUCCH resource among a set of pre-configured (RRC-configured) PUCCH resources.

For the second PUCCH resource (i.e., the resource for the NACK-only feedback for the common codeword 1406), there may be several options for how the UE determines the resource assignment. Two such options are discussed below in turn. In a case where both options are specified, the UE 800 may employ suitable UE capability signaling and the network node 700 can employ RRC configuration to determine which option is supported by the UE and which option is configured.

For example, the slot assignment for the second PUCCH resource may be based on an RRC configured PUCCH resource ID. That is, the resource for the NACK-only feedback 1410 may be semi-statically configured at the RRC signaling. This example can reduce DCI overhead signaling, without requiring information in the DCI 1402 to identify the PUCCH resource. Here, in an example where the NACK-only feedback 1410 is single-bit feedback, the RRC configuration may explicitly identify the resource for the UE 800 to use for the NACK-only feedback 1410. In an example where the NACK-only feedback 1410 is multiple bits of feedback, the RRC configuration may specify a list of PUCCH resources that are configured, and the UE 800 may determine the PUCCH resource to use based on a value of the HARQ-ACK information bits. See, for example, FIG. 9 showing how multi-bit NACK-only feedback may be mapped to a list of PUCCH resources.

In another example, the DCI 1402 may indicate the second PUCCH resource. For example, a separate DCI field (e.g., a second PRI field) may be used to explicitly indicate or identify the second PUCCH resource. In another example, a single DCI field may carry a joint PRI, jointly indicating both the first PUCCH resource and the second PUCCH resource. As in the previous examples, the presence or absence of the second PRI field, or the joint PRI field, may be separately RRC configured per BWP, per CC, or per DCI format (e.g., separately configured for DC format 1_1 versus DCI format 1_2).

In examples wherein the NACK-only feedback includes multiple bits of information, the UE may use the value of the HARQ-ACK information (i.e., the NACK-only payload) in addition to the information in the DCI 1402 to identify or determine the second PUCCH resource. That is, as in previous examples, and as seen in FIG. 9, the DCI 1402 may indicate a list of PUCCH resources, with the final selection of the PUCCH resource being made based on the payload being sent.

FIG. 16 is a flow chart illustrating an exemplary process 1600 for a UE in accordance with some aspects of the present disclosure. As described below, a particular implementation may omit some or all illustrated features, and may not require some illustrated features to implement all embodiments. In some examples, the UE 800 illustrated in FIG. 8 may be configured to carry out the process 1600. In some examples, any suitable apparatus or means for carrying out the functions or algorithm described below may carry out the process 1600.

At block 1602, the UE 800 may receive scheduling information for a private codeword and for a common codeword in a rate-splitting scheme. In some examples, the scheduling information may come in the form of separate DCIs for the private codeword and for the common codeword. In other examples, the scheduling information may come in the form of a single DCI including a first set of scheduling parameters for the private codeword and a second set of scheduling parameters for the common codeword. In some examples, the DCI includes a dynamic indication to utilize NACK-only feedback for a common codeword. The scheduling information may further include a first feedback resource allocation for the transmission of first feedback (e.g., ACK/NACK feedback for the private codeword), and a second feedback resource allocation for the transmission of second feedback (NACK-only feedback for the common codeword). The second feedback resource allocation may in some examples be a dynamic resource assignment for the transmission of the NACK-only feedback. The second feedback resource allocation may in some examples include a list of resources for the UE to choose from based on the feedback payload.

At block 1604, the UE 800 may receive a private codeword and a common codeword in a rate-splitting scheme. In some examples, the private codeword may be received on a first PDSCH and the common codeword may be received on a second PDSCH. In other examples, the private and common codewords may be received in the same PDSCH. In some examples, the common codeword may be a sole common codeword. In other examples, the common codeword may be one of a plurality of common codewords.

At block 1606, the UE 800 may transmit ACK/NACK feedback (described above as the first feedback reporting mode) corresponding to the private codeword. That is, the feedback transmitted at block 1606 may indicate whether the private codeword was properly received and decoded.

At block 1608, the UE 800 may transmit NACK-only feedback (described above as the second feedback reporting mode) corresponding to the common codeword. That is, the feedback transmitted at block 1608 may be used for indicating when the common codeword was not properly received and decoded. In an example where the NACK-only feedback is only one bit, the UE may forgo to transmit feedback corresponding to the common codeword when the common codeword is properly decoded. In an example where the NACK-only feedback is greater than one bit, the NACK-only feedback may use a shared resource, configured to be shared by the devices to which the common codeword is directed.

FIG. 17 is a flow chart illustrating an exemplary process 1700 for a UE in accordance with some aspects of the present disclosure. As described below, a particular implementation may omit some or all illustrated features, and may not require some illustrated features to implement all embodiments. In some examples, the UE 800 illustrated in FIG. 8 may be configured to carry out the process 1700. In some examples, any suitable apparatus or means for carrying out the functions or algorithm described below may carry out the process 1700.

At block 1702, the UE 800 may transmit a UE capability information signal with information indicating UE capabilities relating to NACK-only feedback in connection with a rate splitting scheme. For example, the capability information signal may explicitly indicate a UE capability of using NACK-only feedback for a common codeword in a rate splitting scheme. In another example, the capability information signal may indicate a UE capability to utilize a dynamic indication in a DCI to utilize NACK-only feedback. In another example the capability information signal may indicate a UE capability of determining a slot assignment for NACK-only feedback.

At block 1704, the UE 800 may receive RRC configuration information configuring the UE 800 for NACK-only feedback in connection with a rate splitting scheme. For example, the RRC configuration information may include an explicit indication for the UE 800 to utilize the NACK-only feedback for a common codeword in a rate splitting scheme. In another example, the RRC configuration information may include a configuration enabling the UE 800 to utilize a dynamic indication in a DCI to utilize NACK-only feedback. Here, the RRC configuration may separately configure the UE per BWP, per CC, or per DCI format. In another example, the RRC configuration information may configure the UE 800 to determine a slot assignment for the NACK-only feedback.

In some examples, the RRC configuration information may include a semi-static slot offset for the feedback resource allocation for the transmission of the NACK-only feedback for the common codeword. In further examples, the RRC configuration information may include a semi-static resource indicator for indicating a resource within an assigned slot for the NACK-only feedback for the common codeword. In still further examples, the RRC configuration may include information indicating a list of resources within an assigned slot for the NACK-only feedback resource allocation.

Figure 18:
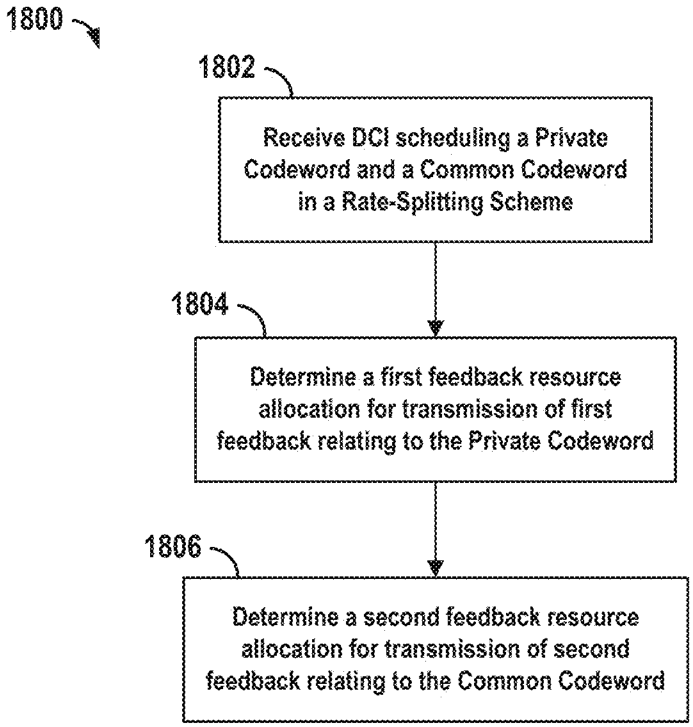
FIG. 18 is a flow chart illustrating an example of a process for a UE determining feedback resources for HARQ-ACK feedback in a rate splitting scheme according to some aspects of this disclosure.

FIG. 18 is a flow chart illustrating an exemplary process 1800 for a UE in accordance with some aspects of the present disclosure. As described below, a particular implementation may omit some or all illustrated features, and may not require some illustrated features to implement all embodiments. In some examples, the UE 800 illustrated in FIG. 8 may be configured to carry out the process 1800. In some examples, any suitable apparatus or means for carrying out the functions or algorithm described below may carry out the process 1800.

At block 1802, the UE 800 may receive a DCI scheduling a private codeword and a common codeword in a rate splitting scheme. In some examples, the DCI may include scheduling information for first and second feedback relating to the private codeword and the common codeword, respectively. This scheduling information may in some examples include a dynamic resource assignment for NACK-only feedback relating to the common codeword.

At block 1804, the UE 800 may determine a first feedback resource allocation for transmission of first feedback relating to the private codeword. For example, the scheduling DCI may include a "K1 value" indicating a slot offset, and a resource assignment within the indicated slot, for the first feedback relating to the private codeword.

At block 1806, the UE 800 may determine a second feedback resource allocation for transmission of second feedback relating to the common codeword. For example, the UE 800 may follow a rule such that the NACK-only feedback is transmitted in the same slot as the slot used for transmission of the ACK/NACK feedback for the private codeword. In another example, the DCI received at block 1802 may include a dynamic slot assignment for the NACK-only feedback resource allocation. Here, the dynamic slot assignment may indicate a slot offset relative to the slot of the common codeword, or a slot offset relative to the slot of the resource allocation for the ACK/NACK feedback for the private codeword.

In some examples, the resource may depend on a decoding success or failure of each common codeword of a plurality of codewords.

Further Examples Having a Variety of Features

Clause 1: A method, apparatus, and non-transitory computer-readable medium for a UE comprises receiving a private codeword and a first common codeword in a rate splitting scheme, wherein the private codeword comprises a first message for the user equipment and the first common codeword comprises a combination of one or more messages including a second message for the user equipment. The UE further transmits a first feedback comprising an acknowledgment or negative-acknowledgment (ACK/NACK) indicating whether the private codeword is properly decoded; and the UE transmits a second feedback comprising a NACK-only feedback when the first common codeword is not properly decoded.

Clause 2: A method, apparatus, and non-transitory computer-readable medium of clause 1, further including forgoing to transmit the second feedback when the first common codeword is properly decoded.

Clause 3: A method, apparatus, and non-transitory computer-readable medium of any of clauses 1 to 2, wherein the second feedback uses a shared resource, configured to be shared by the plurality of devices to which the first common codeword is directed.

Clause 4: A method, apparatus, and non-transitory computer-readable medium of any of clauses 1 to 3, further comprising transmitting a capability information signal indicating a UE capability of using the NACK-only feedback for the first common codeword for the rate-splitting scheme.

Clause 5: A method, apparatus, and non-transitory computer-readable medium of any of clauses 1 to 4, further comprising receiving a plurality of common codewords including the first common codeword, wherein the second feedback comprises the NACK-only feedback for each common codeword of the plurality of common codewords.

Clause 6: A method, apparatus, and non-transitory computer-readable medium of clause 5, further comprising selecting a resource for the second feedback based on a decoding success or failure of each common codeword of the plurality of common codewords.

Clause 7: A method, apparatus, and non-transitory computer-readable medium of any of clauses 1 to 6, further comprising receiving a first downlink control indication (DCI) comprising a first resource allocation for the reception of the private codeword; and receiving a second DCI comprising a second resource allocation for the reception of the first common codeword.

Clause 8: A method, apparatus, and non-transitory computer-readable medium of clause 7, wherein the first DCI further comprises a first feedback resource allocation for the transmission of the first feedback; and wherein the second DCI further comprises a second feedback resource allocation for the transmission of the second feedback.

Clause 9: A method, apparatus, and non-transitory computer-readable medium of any of clauses 1 to 8, further comprising receiving a downlink control indication (DCI) comprising a first set of scheduling parameters for the reception of the private codeword and a second set of scheduling parameters for the reception of the first common codeword.

Clause 10: A method, apparatus, and non-transitory computer-readable medium of clause 9, further comprising: receiving a radio resource control (RRC) message comprising an indication to utilize the NACK-only feedback for the first common codeword.

Clause 11: A method, apparatus, and non-transitory computer-readable medium of clause 9, wherein the DCI comprises a dynamic indication to utilize the NACK-only feedback for the first common codeword.

Clause 12: A method, apparatus, and non-transitory computer-readable medium of clause 11, further comprising transmitting a capability information signal indicating a user equipment capability to utilize the dynamic indication to utilize the NACK-only feedback.

Clause 13: A method, apparatus, and non-transitory computer-readable medium of clause 11, further comprising receiving a radio resource control (RRC) message comprising a configuration enabling the dynamic indication to utilize the NACK-only feedback.

Clause 14: A method, apparatus, and non-transitory computer-readable medium of clause 13, wherein the configuration separately enables the dynamic indication per bandwidth part (BWP), per component carrier (CC), or per DCI format.

Clause 15: A method, apparatus, and non-transitory computer-readable medium of clause 9, wherein the DC further comprises a first feedback resource allocation for the transmission of the first feedback, the method further comprising determining a second feedback resource allocation for the transmission of the second feedback.

Clause 16: A method, apparatus, and non-transitory computer-readable medium of any of clauses 1 to 15, further comprising: receiving a first radio resource control (RRC) message comprising a slot offset for the second feedback resource allocation for the transmission of the second feedback.

Clause 17: A method, apparatus, and non-transitory computer-readable medium of clause 15, further comprising receiving a second radio resource control (RRC) message comprising a resource indicator for a resource within the assigned slot for the second feedback resource allocation for the transmission of the second feedback.

Clause 18: A method, apparatus, and non-transitory computer-readable medium of clause 15, further comprising receiving a second radio resource control (RRC) message comprising information indicating a list of resources within the assigned slot for the second feedback resource allocation; and selecting a resource for the second feedback based on the indicated list of resources, and based on a decoding success or failure of each common codeword of a plurality of common codewords.

Clause 19: A method, apparatus, and non-transitory computer-readable medium of clause 15, wherein determining the second feedback resource allocation comprises determining that the second feedback resource allocation corresponds to a same slot as the first feedback resource allocation.

Clause 20: A method, apparatus, and non-transitory computer-readable medium of clause 15, wherein the DCI further comprises a dynamic slot assignment for the second feedback resource allocation for the transmission of the second feedback.

Clause 21: A method, apparatus, and non-transitory computer-readable medium of any of clauses 1 to 20, wherein the dynamic slot assignment for the second feedback resource allocation indicates one of a first slot offset relative to the slot of the first common codeword, or a second slot offset relative to a slot of the first feedback resource allocation.

Clause 22: A method, apparatus, and non-transitory computer-readable medium of clause 20, further comprising receiving a radio resource control (RRC) message comprising a configuration enabling the dynamic slot assignment for the second feedback resource allocation per bandwidth part (BWP), per component carrier (CC), or per DCI format.

Clause 23: A method, apparatus, and non-transitory computer-readable medium of clause 15, further comprising transmitting a capability information signal indicating a user equipment capability of determining a slot assignment for the second feedback resource allocation, and receiving a radio resource control (RRC) message comprising a configuration for the user equipment to determine the slot assignment for the second feedback resource allocation.

Clause 24: A method, apparatus, and non-transitory computer-readable medium of clause 15, wherein the DCI further comprises a dynamic resource assignment for the second feedback resource allocation for the transmission of the second feedback.

Clause 25: A method, apparatus, and non-transitory computer-readable medium of any of clauses 1 to 24, further comprising receiving a radio resource control (RRC) message comprising a configuration enabling the dynamic resource assignment for the second feedback resource allocation per bandwidth part (BWP), per component carrier (CC), or per DCI format.

Clause 26: A method, apparatus, and non-transitory computer-readable medium of clause 24, wherein determining the second feedback resource allocation comprises selecting a resource for the second feedback based on the dynamic resource assignment for the second feedback resource allocation, and based on a decoding success or failure of each common codeword of a plurality of common codewords.

Clause 27: A method, apparatus, and non-transitory computer-readable medium of clause 15, further comprising transmitting a capability information signal indicating a user equipment capability of determining a resource assignment for the second feedback resource allocation; and receiving a radio resource control (RRC) message comprising a configuration for the user equipment to determine the resource assignment for the second feedback resource allocation.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes certain aspects and examples with reference to some illustrations, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

By way of example, various aspects of this disclosure may be implemented within systems defined by 3GPP, such as fifth-generation New Radio (5G NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the terms "coupled" and/or "communicatively coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions.

Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment configured for wireless communication, comprising:

at least one memory configured to store instructions; and at least one processor coupled to the at least one memory and configured to execute the instructions to cause the user equipment to:

receive a private codeword and a plurality of common codewords, the plurality of common codewords including a first common codeword, in a rate splitting scheme, wherein the private codeword comprises a first message for the user equipment and the first common codeword comprises a combination of one or more messages including a second message for the user equipment;

transmit, using a first resource, a first feedback comprising an acknowledgment or negative-acknowledgment (ACK/NACK) indicating whether the private codeword is properly decoded;

select a second resource for a second feedback comprising NACK-only feedback based on a decoding success or failure of each common codeword of the plurality of common codewords, wherein the second resource is separate from the first resource and is selected upon a failed decoding, and wherein a selection of the second resource is forgone upon a successful decoding of all common codewords of the plurality of common codewords; and transmit the second feedback using the second resource.

2. The user equipment of claim 1, wherein the second resource is a shared resource, configured to be shared by a plurality of devices to which the first common codeword is directed.

3. The user equipment of claim 1, wherein the at least one processor is further configured to cause the user equipment to:

transmit a capability information signal indicating a user equipment capability of using the NACK-only feedback for the first common codeword for the rate splitting scheme.

4. The user equipment of claim 1, wherein the at least one processor is further configured to cause the user equipment to:

receive a first downlink control indication (DCI) comprising a first resource allocation for the reception of the private codeword; and receive a second DCI comprising a second resource allocation for the reception of the first common codeword.

5. The user equipment of claim 4, wherein the first DCI further comprises a first feedback resource allocation for the transmission of the first feedback; and wherein the second DCI further comprises a second feedback resource allocation for the transmission of the second feedback.

6. The user equipment of claim 1, wherein the at least one processor is further configured to cause the user equipment to:

receive a downlink control indication (DCI) comprising a first set of scheduling parameters for the reception of the private codeword and a second set of scheduling parameters for the reception of the first common codeword.

7. The user equipment of claim 6, wherein the at least one processor is further configured to cause the user equipment to:

receive a radio resource control (RRC) message comprising an indication to utilize the NACK-only feedback for the first common codeword.

8. The user equipment of claim 6, wherein the DCI further comprises a dynamic indication to utilize the NACK-only feedback for the first common codeword.

9. The user equipment of claim 8, wherein the at least one processor is further configured to cause the user equipment to:

transmit a capability information signal indicating a user equipment capability to utilize the dynamic indication to utilize the NACK-only feedback.

10. The user equipment of claim 8, wherein the at least one processor is further configured to cause the user equipment to:

receive a radio resource control (RRC) message comprising a configuration enabling the dynamic indication to utilize the NACK-only feedback.

11. The user equipment of claim 10, wherein the configuration separately enables the dynamic indication per bandwidth part (BWP), per component carrier (CC), or per DCI format.

12. The user equipment of claim 6, wherein the DCI further comprises a first feedback resource allocation for the transmission of the first feedback, the at least one processor being further configured to cause the user equipment to determine a second feedback resource allocation for the transmission of the second feedback.

13. The user equipment of claim 12, wherein the at least one processor is further configured to cause the user equipment to:

receive a first radio resource control (RRC) message comprising a slot offset for the second feedback resource allocation for the transmission of the second feedback.

14. The user equipment of claim 12, wherein the at least one processor is further configured to cause the user equipment to:

receive a second radio resource control (RRC) message comprising a resource indicator for a resource within an assigned slot for the second feedback resource allocation for the transmission of the second feedback.

15. The user equipment of claim 12, wherein the at least one processor is further configured to cause the user equipment to:

receive a second radio resource control (RRC) message comprising information indicating a list of resources within an assigned slot for the second feedback resource allocation; and select the second resource for the second feedback based on the indicated list of resources, and based on a decoding success or failure of each common codeword of a plurality of common codewords.

16. The user equipment of claim 12, wherein the at least one processor, being configured to cause the user equipment to determine the second feedback resource allocation, is further configured to cause the user equipment to determine that the second feedback resource allocation corresponds to a same slot as the first feedback resource allocation.

17. The user equipment of claim 12, wherein the DCI further comprises a dynamic slot assignment for the second feedback resource allocation for the transmission of the second feedback.

18. The user equipment of claim 17, wherein the dynamic slot assignment for the second feedback resource allocation indicates one of a first slot offset relative to a slot of the first common codeword, or a second slot offset relative to a slot of the first feedback resource allocation.

19. The user equipment of claim 17, wherein the at least one processor is further configured to cause the user equipment to:

receive a radio resource control (RRC) message comprising a configuration enabling the dynamic slot assignment for the second feedback resource allocation per bandwidth part (BWP), per component carrier (CC), or per DCI format.

20. The user equipment of claim 12, wherein the at least one processor is further configured to cause the user equipment to:

transmit a capability information signal indicating a user equipment capability of determining a slot assignment for the second feedback resource allocation; and receive a radio resource control (RRC) message comprising a configuration for the user equipment to determine the slot assignment for the second feedback resource allocation.

21. The user equipment of claim 12, wherein the DCI further comprises a dynamic resource assignment for the second feedback resource allocation for the transmission of the second feedback.

22. The user equipment of claim 21, wherein the at least one processor is further configured to cause the user equipment to:

receive a radio resource control (RRC) message comprising a configuration enabling the dynamic resource assignment for the second feedback resource allocation per bandwidth part (BWP), per component carrier (CC), or per DCI format.

23. The user equipment of claim 21, wherein the at least one processor, being configured to cause the user equipment to determine the second feedback resource allocation, is further configured to cause the user equipment to:

select the second resource for the second feedback based on the dynamic resource assignment for the second feedback resource allocation, and based on a decoding success or failure of each common codeword of a plurality of common codewords.

24. The user equipment of claim 12, wherein the at least one processor is further configured to cause the user equipment to:

transmit a capability information signal indicating a user equipment capability of determining a resource assignment for the second feedback resource allocation; and receive a radio resource control (RRC) message comprising a configuration for the user equipment to determine the resource assignment for the second feedback resource allocation.

25. The user equipment of claim 1, wherein to select the second resource for the second feedback based on the decoding success or failure of each common codeword of the plurality of common codewords, the at least one processor is further configured to cause the UE to:

map a pattern of decoding successes and failures for the plurality of common codewords to the resource from a pre-configured list of physical uplink control channel (PUCCH) resources.

26. A method of wireless communication for a user equipment, comprising:

receiving a private codeword and a plurality of common codewords, the plurality of common codewords including a first common codeword, in a rate splitting scheme, wherein the private codeword comprises a first message for the user equipment and the first common codeword comprises a combination of one or more messages including a second message for the user equipment;

transmitting, using a first resource, a first feedback comprising an acknowledgment or negative-acknowledgment (ACK/NACK) indicating whether the private codeword is properly decoded;

selecting a second resource for a second feedback comprising NACK-only feedback based on a decoding success or failure of each common codeword of the plurality of common codewords, wherein the second resource is separate from the first resource and is selected upon a failed decoding, and wherein a selection of the second resource is forgone upon a successful decoding of all common codewords of the plurality of common codewords; and transmitting the second feedback using the second resource.

27. The method of claim 26, wherein selecting the second resource for the second feedback based on the decoding success or failure of each common codeword of the plurality of common codewords comprises:

mapping a pattern of decoding successes and failures for the plurality of common codewords to the resource from a pre-configured list of physical uplink control channel (PUCCH) resources.

28. A user equipment configured for wireless communication, comprising:

means for receiving a private codeword and a plurality of common codewords, the plurality of common codewords including a first common codeword, in a rate splitting scheme, wherein the private codeword comprises a first message for the user equipment and the first common codeword comprises a combination of one or more messages including a second message for the user equipment;

means for transmitting, using a first resource, a first feedback comprising an acknowledgment or negative-acknowledgment (ACK/NACK) indicating whether the private codeword is properly decoded;

means for selecting a second resource for a second feedback comprising NACK-only feedback based on a decoding success or failure of each common codeword of the plurality of common codewords, wherein the second resource is separate from the first resource and is selected upon a failed decoding, and wherein a selection of the second resource is forgone upon a successful decoding of all common codewords of the plurality of common codewords; and means for transmitting the second feedback using the second resource.

29. A non-transitory computer-readable medium storing computer-executable code, comprising code for causing a user equipment to:

receive a private codeword and a plurality of common codewords, the plurality of common codewords including a first common codeword, in a rate splitting scheme, wherein the private codeword comprises a first message for the user equipment and the first common codeword comprises a combination of one or more messages including a second message for the user equipment;

transmit, using a first resource, a first feedback comprising an acknowledgment or negative-acknowledgment (ACK/NACK) indicating whether the private codeword is properly decoded;

select a second resource for a second feedback comprising NACK-only feedback based on a decoding success or failure of each common codeword of the plurality of common codewords, wherein the second resource is separate from the first resource and is selected upon a failed decoding, and wherein a selection of the second resource is forgone upon a successful decoding of all common codewords of the plurality of common codewords; and transmit the second feedback using the second resource.

* * * * *